US008429010B2

(12) United States Patent
Kurauchi

(10) Patent No.: US 8,429,010 B2
(45) Date of Patent: Apr. 23, 2013

(54) CM DATA MANAGEMENT APPARATUS/METHOD, PAY-PROGRAM RECEPTION TERMINAL/METHOD, PAY-PROGRAM TRANSMISSION/RECEPTION SYSTEM, AND COMPUTER-READABLE STORAGE MEDIUM STORING COMPUTER PROGRAM TO REALIZE THESE METHODS

(75) Inventor: Nobukazu Kurauchi, Nagoya (JP)

(73) Assignee: Panasonic Corporation, Osaka (JP)

( * ) Notice: Subject to any disclaimer, the term of this patent is extended or adjusted under 35 U.S.C. 154(b) by 2437 days.

(21) Appl. No.: 10/173,395

(22) Filed: Jun. 17, 2002

(65) Prior Publication Data

US 2002/0199201 A1    Dec. 26, 2002

(30) Foreign Application Priority Data

Jun. 18, 2001 (JP) ................................ 2001-183572

(51) Int. Cl.
*G06Q 30/00* (2012.01)

(52) U.S. Cl.
USPC ............................................ 705/14.4; 725/42

(58) Field of Classification Search ............... 705/14, 705/14.69; 725/42, 104
See application file for complete search history.

(56) References Cited

U.S. PATENT DOCUMENTS

| 5,446,488 | A | * | 8/1995 | Vogel ............................... 725/151 |
| 5,721,827 | A | * | 2/1998 | Logan et al. ..................... 709/217 |
| 5,886,731 | A | * | 3/1999 | Ebisawa ........................... 725/32 |
| 6,057,872 | A | * | 5/2000 | Candelore ........................ 725/23 |
| 7,415,717 | B1 | * | 8/2008 | Nagumo .......................... 725/47 |
| 2001/0003195 | A1 | | 6/2001 | Kajimoto |
| 2001/0037240 | A1 | * | 11/2001 | Marks et al. .................... 705/14 |
| 2002/0083439 | A1 | * | 6/2002 | Eldering ......................... 725/32 |
| 2003/0126014 | A1 | * | 7/2003 | Oh ................................. 705/14 |

FOREIGN PATENT DOCUMENTS

| JP | 07-203420 | 8/1995 |
| JP | 09-065321 | 3/1997 |
| JP | 09-130346 | 5/1997 |
| JP | 2000-013767 | 1/2000 |
| JP | 2001-13767 | 1/2000 |
| JP | 2001-53695 | 2/2001 |
| JP | 2001-224006 | 8/2001 |
| JP | 2002-125215 | 4/2002 |

* cited by examiner

*Primary Examiner* — Matthew L Hamilton

(57) ABSTRACT

A pay-program transmission/reception system provides a pay program at low viewing fee by inserting CMs. A viewer who wants a program without CMs does not newly receive a CM-deleted program. A CM data management apparatus transmits, to a pay-program reception terminal, (a) a CM-inserted program constituted from video/audio and CM data, and (b) a CM-inserted program schedule showing reproduction orders thereof, when receiving a program request by a program name designated in the pay-program reception terminal. The pay-program reception terminal, when its input reception unit receives the CM deletion request from the viewer after its video/audio processing unit reproduces the CM-inserted program, passes the request to the CM data management apparatus, obtains a CM-deleted program schedule, and reproduces the pay program without CMs.

13 Claims, 30 Drawing Sheets

FIG. 3

301 PAY-PROGRAM TABLE

| PROGRAM NAME | VIEWING FEE |
|---|---|
| MOVIE 1 | 400YEN |
| MOVIE 2 | 500YEN |
| ... | ... |

402 CM-INSERTED PROGRAM SCHEDULE

| PROGRAM NAME | FILE ID | START POINT | REPRODUCTION TIME PERIOD |
|---|---|---|---|
| CM-INSERTED MOVIE 1 | CUT 1 | 0 | 5MIN. |
| | CM 1 | 0 | 1MIN. |
| | CUT 2 | 0 | 4MIN. |
| | CM 2 | 0 | 30SEC. |
| | ... | ... | ... |
| 501 | 502 | 503 | 504 |

FIG. 6

601 PROGRAM SCHEDULE

| PROGRAM NAME | FILE ID | START POINT | REPRODUCTION TIME PERIOD |
|---|---|---|---|
| MOVIE 1 | CUT 1 | 0 | 5MIN. |
| | CUT 2 | 0 | 4MIN. |
| | ... | ... | ... |

FIG. 7

| CM NAME | FILE ID | START POINT | REPRODUCTION TIME PERIOD |
|---|---|---|---|
| CM 1 | CM 1 | 0 | 1 MIN. |
| CM 2 | CM 2 | 0 | 30 SEC. |
| ... | ... | ... | ... |

701  CM TABLE

FIG. 8

801 TRANSMISSION COUNT TABLE

| PROGRAM/CM NAME | TRANSMISSION NUMBER TO PAY-PROGRAM RECEPTION TERMINAL |
|---|---|
| MOVIE 1 | 1 |
| CM 1 | 2 |
| CM 2 | 3 |

| 901 | PAY-PROGRAM RECEIVING FEE/ ADVERTISEMENT FEE TABLE | | | |
|---|---|---|---|---|
| PROGRAM/ CM NAME | TOTAL TRANSMISSION NUMBER TO PAY-PROGRAM RECEPTION TERMINAL | ONE-TIME TRANSMISSION FEE | PAY-PROGRAM RECEIVING FEE/ ADVERTISEMENT FEE | |
| MOVIE 1 | 37 | 900YEN | 33,300YEN | |
| MOVE 2 | 28 | 1,100YEN | 30,800YEN | |
| CM 1 | 158 | 120YEN | 18,960YEN | |
| CM 2 | 195 | 100YEN | 19,500YEN | |
| 902 | 903 | 904 | 905 | |

FIG. 10

1001 ADDITIONAL FEE TABLE

| PAY-PROGRAM RECEPTION TERMINAL ID | PROGRAM NAME | CM NAME | DELETION NUMBER | ONE-TIME DELETION FEE | ADDITIONAL FEE |
|---|---|---|---|---|---|
| 102 | CM-INSERTED MOVIE 1 | CM 1 | 2 | 120YEN | 540YEN |
|  |  | CM 2 | 3 | 100YEN |  |
| ... | ... | ... | ... | ... | ... |
| 1002 | 1003 | 1004 | 1005 | 1006 | 1007 |

FIG. 11

1101 RETURN FEE CALCULATION TABLE

| CM NAME | TOTAL DELETION NUMBER | ONE-TIME DELETION FEE | RETURN FEE |
|---|---|---|---|
| CM 1 | 85 | 120YEN | 10,200YEN |
| CM 2 | 105 | 100YEN | 10,500YEN |

1301 DISCOUNTED ADDITIONAL FEE TABLE

| PAY-PROGRAM RECEPTION TERMINAL ID | PROGRAM NAME | CM NAME | DELETION NUMBER | ONE-TIME DELETION FEE | VIEWING NUMBER | ONE-TIME VIEWING DISCOUNT | DISCOUNTED ADDITIONAL FEE |
|---|---|---|---|---|---|---|---|
| 102 | CM-INSERTED MOVIE 1 | CM1 | 2 | 120YEN | 2 | 12YEN | 486YEN |
| | | CM2 | 3 | 100YEN | 3 | 10YEN | |

1501 CM-INSERTED PROGRAM SCHEDULE

| 501 PROGRAM NAME | 502 FILE ID | 503 START POINT | 504 REPRODUCTION TIME PERIOD | 1502 REMARK |
|---|---|---|---|---|
| CM-INSERTED MOVIE 1 | CUT1 | 0 | 5MIN. | — |
|  | CM1 | 0 | 1MIN. | CM OF COMPANY "M" |
|  | CUT2 | 0 | 4MIN. | — |
|  | CM2 | 0 | 30SEC. | CM OF COMPANY "T" |
| ... | ... | ... | ... | ... |

FIG. 17

1701 CM-INSERTED PROGRAM SCHEDULE

| PROGRAM NAME 501 | FILE ID 502 | START POINT 503 | REPRODUCTION TIME PERIOD 504 | CM JUDGMENT 1702 | CM DELETION JUDGMENT 1703 |
|---|---|---|---|---|---|
| CM-INSERTED MOVIE 1 | CUT1 | 0 | 5MIN. | × | — |
| | CM1 | 0 | 1MIN. | ○ | × |
| | CUT2 | 0 | 4MIN. | × | — |
| | CM2 | 0 | 30SEC. | ○ | ○ |
| | ... | ... | ... | ... | ... |

FIG. 22

2201 PROGRAM SCHEDULE

| PROGRAM NAME | FILE ID | START POINT | REPRODUCTION TIME PERIOD |
|---|---|---|---|
| MOVIE 1 | CUT1 | 0 | 5MIN. |
| | CUT2 | 0 | 4MIN. |
| | CUT3 | 0 | 4MIN. |
| | CUT4 | 0 | 5MIN. |
| | ... | ... | ... |

FIG. 23

CM-INSERTED PROGRAM SCHEDULE 2301

| PROGRAM NAME | FILE ID | START POINT | REPRODUCTION TIME PERIOD |
|---|---|---|---|
| CM-INSERTED MOVIE 1 | CUT1 | 0 | 5MIN. |
| | CM1 | 0 | 1MIN. |
| | CUT2 | 0 | 4MIN. |
| | CM2 | 0 | 30SEC. |
| | CUT4 | 0 | 5MIN. |
| | ... | ... | ... |

FIG. 24

2401 NO-CUT VERSION PROGRAM SCHEDULE

| PROGRAM NAME | FILE ID | START POINT | REPRODUCTION TIME PERIOD |
|---|---|---|---|
| MOVIE 1 | CUT1 | 0 | 5MIN. |
| | CUT2 | 0 | 4MIN. |
| | http://.../... | 0 | 4MIN. |
| | CUT4 | 0 | 5MIN. |
| | ... | ... | ... |

2601 CM-INSERTED PROGRAM SCHEDULE

| PROGRAM NAME | FILE ID | START POINT | REPRODUCTION TIME PERIOD | CM JUDGMENT | VIDEO/AUDIO CUT JUDGMENT |
|---|---|---|---|---|---|
| CM-INSERTED MOVIE 1 | CUT1 | 0 | 5 MIN. | × | × |
| | CM1 | 0 | 1 MIN. | ○ | — |
| | CUT2 | 0 | 4 MIN. | × | × |
| | CM2 | 0 | 30 SEC. | ○ | — |
| | CUT3 | 0 | 4 MIN. | × | ○ |
| | CM3 | 0 | 1 MIN. | ○ | — |
| | CUT4 | 0 | 5 MIN. | × | × |
| | ... | ... | ... | ... | ... |
| 501 | 502 | 503 | 504 | 1702 | 2602 |

FIG. 28

CM-INSERTED PROGRAM SCHEDULE 2801

| PROGRAM NAME | FILE ID | START POINT | REPRODUCTION TIME PERIOD | CM JUDGMENT | VIDEO/AUDIO CUT JUDGMENT | RESTORATION PRIORITY LEVEL |
|---|---|---|---|---|---|---|
| CM-INSERTED MOVIE 1 | CUT1 | 0 | 5MIN. | × | × | 1 |
| | CM1 | 0 | 1MIN. | ○ | — | 1 |
| | CUT2.1 | 0 | 4MIN. | × | × | 1 |
| | CUT2.2 | 0 | 4MIN. | × | ○ | 1 |
| | CM2 | 0 | 30SEC. | ○ | — | 1 |
| | CUT3 | 0 | 4MIN. | × | × | 1 |
| | CM3 | 0 | 1MIN. | ○ | — | 1 |
| | CUT4.1 | 0 | 5MIN. | × | × | 1 |
| | CUT4.2 | 0 | 5MIN. | × | ○ | 2 |
| | CUT4.3 | 0 | 5MIN. | × | ○ | 3 |
| | ... | ... | ... | ... | ... | ... |
| 501 | 502 | 503 | 504 | 1702 | 2602 | 2802 |

FIG. 29

VIEWING LIMITATION TABLE
2901

| CM NAME | MAXIMUM VIEWING NUMBER |
|---------|------------------------|
| CM 1    | 20                     |
| CM 2    | 30                     |
| CM 3    | 25                     |
| ⋮       | ⋮                      |

CM DATA MANAGEMENT APPARATUS/METHOD, PAY-PROGRAM RECEPTION TERMINAL/METHOD, PAY-PROGRAM TRANSMISSION/RECEPTION SYSTEM, AND COMPUTER-READABLE STORAGE MEDIUM STORING COMPUTER PROGRAM TO REALIZE THESE METHODS

BACKGROUND OF THE INVENTION (1) Field of the Invention

The present invention relates to a pay-program transmission/reception system that provides a pay program at a low viewing fee by inserting commercial messages into the pay program.

(2) Description of the Related Art

In addition to the existing terrestrial broadcast, various broadcasting systems using communication satellite, broadcast satellite, CATV (cable television), the Internet, etc, have emerged recently.

Particularly in the digital broadcasting system using communication satellite and broadcast satellite, and in the Internet broadcasting system using the Internet, not only conventional transmission and reception of video/audio data but also transmission and reception of an electronic program guide together with video/audio data are enabled.

The price structure of each broadcasting system varies in the following way. Like the conventional commercial broadcasting system using a terrestrial wave, some broadcasting systems are run by advertisement fees paid by advertisers for commercial messages (hereafter simply, "CMs") inserted into programs. Other broadcasting systems are run by viewing fees collected from viewers for each channel or for each program.

Here, a viewing fee of a pay program to be collected from a viewer can be reduced by inserting CMs into the pay program. One example of techniques for inserting CMs into a pay program is disclosed in Japanese Laid-open Patent Application No. H7-203420. Also, one example of techniques for inserting CMs based on attribute information of video/audio data is disclosed in Japanese Laid-open Patent Application No. 2000-13767.

However, CMs are not what viewers want to view. When a viewer comes to like a certain pay program in which CMs are inserted, therefore, he or she may wish to delete the CMs and view only the pay program.

In particular, TV drama programs and TV cartoon programs held by broadcasting stations are often in a long series, with their broadcasting time periods being long and viewing fees being high. General viewers currently have no choice but to purchase a pay program in which CMs are inserted at a viewing fee being reduced due to the CM insertion. Inevitably, these viewers are subject to viewing a large number of CMs when viewing a series of TV drama programs or a series of TV cartoon programs. A viewer may naturally wish to pay an additional viewing fee or the like, to delete CMs from his or her favorite TV drama program or the like.

To achieve this wish, the viewer has been required to newly purchase a no-CM version of the pay program after obtaining the pay program in which CMs are inserted. Not only this takes time but also this may charge the viewer with an additional communication fee if the viewer purchases the no-CM version of the pay program via the Internet.

On the other hand, deleting CMs from pay programs whose viewing fees are being reduced by inserting the CMs surely disprofits the CM advertisers as they lose the advertisement opportunities due to the CM deletion.

Further, when CMs are inserted into a pay program, scenes (video/audio data) of the pay program may be cut out for the interest of broadcasting time or for the purpose of differentiating the CM-inserted pay program from its no-CM version. If a viewer wishes to delete the CMs from such a CM-inserted pay program and still wishes to view the whole pay program including the cut scenes, the viewer is required to newly obtain the pay program of no-CM version.

SUMMARY OF THE INVENTION

In view of the above problems, a first object of the present invention is to provide a pay-program transmission/reception system that can ease a burden on a viewer who requests deletion of CMs that have been inserted into a pay program to reduce its viewing fee.

A second object of the present invention is to provide a pay-program transmission/reception system that does not disprofit an advertiser of the CMs that have been inserted into the pay program.

A third object of the present invention is to ease a burden on a viewer who requests restoration of scenes that have been cut out due to the inserted CMs.

The first object of the present invention can be achieved by a commercial message management apparatus for managing a CM-inserted program that is a pay program into which commercial messages are inserted, and transmitting the CM-inserted program to a plurality of pay-program reception terminals, the apparatus including: a program storing unit storing CM-inserted programs, to each of which a CM-inserted program schedule is attached, the CM-inserted program schedule showing a reproduction order of (a) pieces of pay-program video and audio data and (b) pieces of commercial message data; a program transmitting unit for, when receiving a request for a pay program from one of the pay-program reception terminals, reading a CM-inserted program corresponding to the requested pay program and a CM-inserted program schedule attached thereto, from the program storing unit, and transmitting the read CM-inserted program and the read CM-inserted program schedule, to the one of the pay program reception terminals; and a program schedule transmitting unit for transmitting a CM-deleted program schedule that shows a reproduction order of only the pieces of pay-program video and audio data to the one of the pay-program reception terminals, when receiving a CM deletion request to delete commercial messages from the requested pay program from the one of the pay-program reception terminals.

The first object of the present invention can also be achieved by a pay-program reception terminal that receives a CM-inserted program that is a pay program into which commercial messages are inserted, from a commercial message management apparatus for managing the CM-inserted program, and that reproduces the CM-inserted program, the terminal including: a transmission requesting unit for giving a request for a pay program to the commercial message management apparatus; a program storing unit for receiving a CM-inserted program corresponding to the requested pay program and a CM-inserted program schedule attached thereto that are transmitted from the commercial message management apparatus, the CM-inserted program schedule showing a reproduction order of (a) pieces of pay-program video and audio data and (b) pieces of commercial message data, and storing the received CM-inserted program and the received CM-inserted program schedule; a reproducing unit for reproducing the pieces of pay-program video and audio data and the pieces of commercial message data, according to the reproduction order shown by the CM-inserted program schedule; a CM deletion requesting unit for giving a CM deletion request to delete commercial messages from the requested pay program, to the commercial message management apparatus; and a program schedule storing unit for receiving a CM-deleted program schedule that shows a reproduction order of only the pieces of pay-program video and audio data, and storing the received CM-deleted program schedule, wherein the reproducing unit reproduces the pieces of pay-program video and audio data according to the reproduction order shown by the CM-deleted program schedule, after the CM-deleted program schedule is stored by the program schedule storing unit.

The first object of the present invention can also be achieved by a pay-program transmission and reception system including: a commercial message management apparatus that manages CM-inserted programs that each are a pay program in which commercial messages are inserted; and a plurality of pay-program reception terminals that receive a CM-inserted program from the commercial message management apparatus and reproduce the received CM-inserted program, wherein the commercial message management apparatus includes: a program storing unit storing CM-inserted programs, to each of which a CM-inserted program schedule is attached, the CM-inserted program schedule showing a reproduction order of (a) pieces of pay-program video and audio data and (b) pieces of commercial message data; a program transmitting unit for, when receiving a request for a pay program from one of the pay-program reception terminals, reading a CM-inserted program corresponding to the requested pay program and a CM-inserted program schedule attached thereto, from the program storing unit, and transmitting the read CM-inserted program and the read CM-inserted program schedule to the one of the pay program reception terminals; and a program schedule transmitting unit for transmitting a CM-deleted program schedule showing a reproduction order of only the pieces of pay-program video and audio data to the one of the pay-program reception terminals, when receiving a CM deletion request to delete commercial messages from the requested pay program from the one of the pay-program reception terminals, and each pay-program reception terminal includes: a transmission requesting unit for giving a request for a pay program to the commercial message management apparatus; a program storing unit for receiving a CM-inserted program corresponding to the requested pay program and a CM-inserted program schedule attached thereto that are transmitted from the commercial message management apparatus, the CM-inserted program schedule showing a reproduction order of (a) pieces of pay-program video/audio data and (b) pieces of commercial message data, and storing the received CM-inserted program and the received CM-inserted program schedule; a reproducing unit for reproducing the pieces of pay-program video and audio data and the pieces of commercial message data, according to the reproduction order shown by the CM-inserted program schedule; a CM deletion requesting unit for giving a CM deletion request to delete commercial messages from the requested pay program, to the commercial message management apparatus; and a program schedule storing unit for receiving a CM-deleted program schedule that shows a reproduction order of only the pieces of pay-program video and audio data, and storing the received CM-deleted program schedule, wherein the reproducing unit reproduces the pieces of pay-program video and audio data according to the reproduction order shown by the CM-deleted program schedule, after the CM-deleted program schedule is stored by the program schedule storing unit.

According to this construction, a viewer who wishes to delete CMs from a pay program is only required to newly obtain a program schedule for the pay program, thereby saving the viewer the time and a communication fee for newly receiving video/audio data of the pay program.

The second object of the present invention can be achieved by the commercial message management apparatus, further including a deletion calculating unit for, when receiving the CM deletion request, calculating an additional fee to be charged on the one of the pay-program reception terminals according to a number of the commercial messages to be deleted, and calculating a return fee to be returned to an advertiser according to the number of the commercial messages to be deleted.

According to this construction, an additional viewing fee arising from CM deletion that is to be charged on a pay-program reception terminal according to the number of CMs that are to be deleted can be calculated, and also, a return fee of an advertisement fee to be returned to an advertiser who loses an advertisement opportunity due to the CM deletion can be calculated.

Also, the commercial message management apparatus may further include; an additional fee notifying unit for giving a notification of the additional fee calculated by the deletion calculating unit to the one of the pay-program reception terminals; and a program schedule transmission permitting unit for permitting, after receiving a message indicating an agreement on the additional fee from the one of the pay-program reception terminals, the program schedule transmitting unit to transmit the CM-deleted program schedule to the one of the pay-program reception terminals.

Also, the pay-program reception terminal may further include an agreement notifying unit for receiving a notification of an additional viewing fee from the commercial message management apparatus and notifying a message indicating an agreement on the additional viewing fee.

According to this construction, a viewer can judge whether to view or not a pay program without CMs by paying an additional viewing fee.

Also, in the commercial message management apparatus, the CM-inserted program schedule may include a CM deletion judgment field showing a judgment result as to whether each piece of commercial message data is to be deleted or not, the CM deletion judgment field may show that no pieces of commercial message data are to be deleted when the CM-inserted program schedule is transmitted by the program transmitting unit, and the program schedule transmitting unit may transmit a message indicating reception of the agreement on the additional viewing fee to the one of the pay-program reception terminals, instead of transmitting the CM-deleted program schedule.

Further, in the pay-program reception terminal, the CM-inserted program schedule may include a CM deletion judgment field showing a judgment result as to whether each piece of the commercial message data is to be deleted or not, the CM deletion judgment field may show that no pieces of commercial message data are to be deleted when the CM-inserted program schedule is transmitted, the commercial message management apparatus may transmit a message indicating reception of the agreement on the additional viewing fee, instead of transmitting the CM-deleted program schedule, the program schedule storing unit may receive the message indicating reception of the agreement, and may write, for each piece of commercial message data relating to the CM deletion request, a judgment result indicating "deletion" in the CM deletion judgment field, and the reproducing unit may reproduce the pieces of pay-program video and audio data, and pieces of commercial message data other than pieces of commercial message data whose judgment results in the CM deletion judgment field show "deletion".

According to this construction, a pay-program reception terminal can reproduce a pay program from which CMs are deleted, without requiring the CM data management apparatus to transmit a program schedule to the pay-program reception terminal in response to a CM deletion request from a viewer.

Also, in the commercial message management, one or more of the pieces of pay-program video and audio data may have been cut out due to insertion of the pieces of commercial message data, the CM-inserted program schedule may include a video and audio cut judgment field showing a judgment result as to whether each of the cut pieces of pay-program video and audio data remains to be cut out or not, the video and audio cut judgment field may show that all the cut pieces of the pay-program video and audio data remain to be cut out when the CM-inserted program schedule is transmitted by the program transmitting unit, and the program schedule transmitting unit may transmit a message indicating reception of the agreement on the additional viewing fee to the one of the pay-program reception terminals, instead of transmitting the CM-deleted program schedule.

Further, in the pay-program reception terminal, one or more of the pieces of pay-program video and audio data may have been cut out due to insertion of the pieces of commercial message data, the CM-inserted program schedule may include a video and audio cut judgment field showing a judgment result as to whether each of the cut pieces of pay-program video and audio data remains to be cut out or not, the video and audio cut judgment field may show that all the cut pieces of the pay-program video and audio data remain to be cut out when the CM-inserted program schedule is transmitted, the commercial message management apparatus may transmit a message indicating reception of the agreement on the additional viewing fee, instead of transmitting the CM-deleted program schedule, and the program schedule storing unit may receive the message indicating reception of the agreement, may not reproduce the pieces of commercial message data, and may write, in the video and audio cut judgment field, a judgment result indicating "uncut".

According to this construction, the CM data management apparatus is not required to transmit a program schedule in response to a CM deletion request from a pay-program reception terminal. Also, the pay-program reception terminal can reproduce the pieces of video/audio data that have been cut out due to CM insertion.

Also, in the commercial message management apparatus, the deletion calculating unit may include: a discount calculating unit for calculating a discount on the additional fee based on a number of commercial messages that have been viewed, and for receiving a notification of a number of times each commercial message has been viewed from the one of the pay-program reception terminals; and a discounted additional fee calculating unit for calculating a discounted additional fee, by subtracting the discount calculated by the discount calculating unit from the additional fee.

Further, the pay-program reception terminal may further include a viewing record notifying unit for counting a number of times each commercial message has been viewed in the reproducing unit, and giving a notification of the counted number of times each commercial message has been viewed, to the commercial message management apparatus, the commercial message management apparatus calculating a discount according to a number of deleted commercial messages that have been viewed, and calculating an additional viewing fee with the discount.

According to this construction, a viewer is encouraged to view CMs.

Also, the commercial message management may further include: a counting unit for counting, as to a pay program and commercial messages included in the CM-inserted program transmitted by the program transmitting unit, a number of times the pay program has been transmitted, and a number of times each commercial message has been transmitted, the number of times the pay program has been transmitted being associated with a name of the pay program, the number of times each commercial message has been transmitted being associated with a name of the commercial message; and a calculating unit for storing a program-receiving fee charged for one-time transmission of each pay program and an advertisement fee charged for one-time transmission of each commercial message, and calculating a program-receiving fee according to the counted number of times the pay program has been transmitted, and an advertisement fee according to the counted number of times each commercial message has been transmitted.

According to this construction, a viewing fee of a pay program to be charged on a viewer can be reduced by inserting CMs of an advertiser into the pay program and collecting an advertisement fee from the advertiser. Also, a pay-program receiving fee can be paid according to the number of pay programs transmitted to the viewer. Further, an advertisement fee can be collected according to the number of CMs transmitted to the viewer.

Also, in the commercial message management apparatus, the counting unit may refer to the CM-inserted program schedule transmitted by the program transmitting unit, to count the number of times the pay program has been transmitted and the number of times each commercial message has been transmitted.

According to this construction, the number of transmitted pay programs and the number of transmitted CMs can be counted easily.

Also, the commercial message management apparatus may further include: an additional fee calculating unit for receiving names of the commercial messages that are selected to be deleted by the one of the pay-program reception terminals, and calculating an additional viewing fee to be charged on the one of the pay-program reception terminals according to a number of the commercial messages to be deleted; and an additional fee notifying unit for giving a notification of the calculated additional viewing fee to the one of the pay-program reception terminals, wherein the program schedule transmitting unit transmits, to the one of the pay-program reception terminals, the CM-deleted program schedule that does not show a reproduction order of the pieces of commercial message data that have been selected to be deleted but that shows the reproduction order of only the pieces of pay-program video and audio data.

Further, in the pay-program reception terminal, the commercial message deletion requesting unit may include: a selection receiving unit for receiving a selection of a commercial message that is to be deleted; and a deletion CM name notifying unit for giving a notification of a name of the selected commercial message to the commercial message management apparatus, wherein the reproducing unit reproduces the pieces of pay-program video and audio data, and pieces of commercial message data that have not been selected to be deleted, according to the reproduction order shown by the CM-deleted program schedule.

According to this construction, a viewer can select a CM to be deleted.

Also, in the commercial message management apparatus, one or more of the pieces of pay-program video and audio data may have been cut out due to insertion of the pieces of commercial message data, the CM-inserted program schedule may include a priority level field, in addition to a video and audio cut judgment field showing a judgment result as to whether each of the cut pieces of pay-program video and audio data remains to be cut out or not, the video and audio cut judgment field may show that all the cut pieces of the pay-program video and audio data remain to be cut out when the CM-inserted program schedule is transmitted by the program transmitting unit, and the commercial message management apparatus may further include: an additional fee calculating unit for receiving names of the commercial messages that are selected to be deleted by the one of the pay-program reception terminals, and calculating an additional viewing fee to be charged on the one of the pay-program reception terminals according to a number of the commercial messages to be deleted; and an additional fee notifying unit for giving a notification of the calculated additional viewing fee to the one of the pay-program reception terminals, wherein the program schedule transmitting unit transmits, to the one of the pay-program reception terminals, a message indicating reception of an agreement on the additional viewing fee, instead of transmitting the CM-deleted program schedule.

Further, in the pay-program reception terminal, one or more of the pieces of pay-program video and audio data may have been cut out due to insertion of the pieces of commercial message data, the CM-inserted program schedule may include a priority level field, in addition to a video and audio cut judgment field showing a judgment result as to whether each of the cut pieces of pay-program video and audio data remains to be cut out or not, the video and audio cut judgment field may show that all the cut pieces of pay-program video and audio data remain to be cut out when the CM-inserted program schedule is transmitted, the CM deletion request unit may include: a selection receiving unit for receiving a selection of the commercial messages that are to be deleted; and a deletion CM name notifying unit for giving a notification of names of the selected commercial messages to the commercial message management apparatus, and the program schedule storing unit may receive a message indicating reception of an agreement on an additional viewing fee from the commercial message management apparatus, may not reproduce pieces of commercial message data corresponding to the commercial messages that have been selected to be deleted, and may write, in the video and audio cut judgment field, based on a priority level shown in the priority level field, a judgment result showing "uncut" or not, according to a number of the commercial messages to be deleted, and the reproducing unit may reproduce pieces of pay-program video and audio data whose judgment results in the video and audio cut judgment field show "uncut", and pieces of commercial message data corresponding to commercial messages that have not been selected to be deleted.

According to this construction, a viewer can view a pay program with the cut pieces of video/audio data due to CM insertion being restored, by paying an additional viewing fee according to the number of deleted CMs.

Also, in the commercial message management apparatus, when receiving the CM deletion request from an advertiser apparatus that receives a CM purchase request to purchase a commercial message product that makes an advertisement by a piece of commercial message data from the one of the pay-program reception terminals, and that receives the CM deletion request from the one of the pay-program reception terminals, the program schedule transmitting unit may transmit a CM-deleted program schedule showing a reproduction order of only pieces of commercial message data other than the piece of commercial message data corresponding to the purchased commercial message product, and the pieces of pay-program video and audio data, to the one of the pay-program reception terminals.

Also, the pay-program reception terminal may further include: a purchase requesting unit for giving a CM purchase request to purchase a commercial message product that makes an advertisement by a piece of commercial message data, to an advertiser apparatus; and a CM deletion requesting unit for giving the CM deletion request to the advertiser apparatus, wherein the program schedule storing unit receives a CM-deleted program schedule that shows a reproduction order of only pieces of commercial message data other than the piece of commercial message data corresponding to the purchased commercial message product and the pieces of pay-program video and audio data from the commercial message management apparatus that has received the CM deletion request via the advertiser apparatus, and stores the received CM-deleted program schedule.

Also, the pay-program transmission and reception system further may further include an advertiser apparatus that includes: a purchase receiving unit for receiving a CM purchase request to purchase a commercial message product that makes an advertisement by a piece of commercial message data; and a CM deletion requesting unit for, when receiving the CM deletion request from the one of the pay-program reception terminals, giving the CM deletion request to the commercial message management apparatus, wherein the commercial message management apparatus receives the CM deletion request from the advertiser apparatus, and transmits the CM-deleted program schedule showing a reproduction order of only pieces of commercial message data other than the piece of commercial message data corresponding to the purchased commercial message product, and the pieces of pay-program video and audio data, to the one of the pay-program reception terminals.

According to this construction, a viewer is encouraged to purchase CM products, and the viewer who has purchased the CM products can view a pay program from which CMs are deleted.

Also, the pay-program reception terminal may further include: a viewing fee calculating unit for calculating an additional viewing fee according to a number of the commercial messages that are requested to be deleted by the CM deletion requesting unit; a discount calculating unit for calculating a discount on the additional viewing fee, based on a number of commercial messages that have been viewed; and a discounted additional fee calculating unit for calculating a discounted additional fee, by subtracting the discount calculated by the discount calculating unit from the additional viewing fee, wherein the reproducing unit displays the discounted additional fee.

According to this construction, a viewer can know an additional viewing fee without waiting to receive a notification of the additional viewing fee transmitted from the CM data management apparatus.

Also, in the commercial message management apparatus, the program transmitting unit may transmit, together with the CM-inserted program and the CM-inserted program schedule, a viewing limitation table showing a maximum viewing number of each commercial message, to the one of the pay-program reception terminals.

Further, in the pay-program reception terminal, the program schedule storing unit may further receive a viewing limitation table that shows a maximum viewing number of each commercial message transmitted from the commercial message management apparatus, and storing the received viewing limitation table, and the reproducing unit may reproduce each piece of commercial message data so as not to exceed the maximum viewing number being set in the viewing limitation table.

According to this construction, reproduction of CM data can be limited by setting the maximum reproduction number to avoid such repeated CM reproduction that does not produce advertisement effect anymore. Also, this can prevent a viewer from being tired of repeatedly viewing the same CM.

Also, in the commercial message management apparatus, the program storage unit may include: a CM-inserted program storing unit storing CM-inserted programs; and a CM-inserted program schedule storing unit storing CM-inserted program schedules.

The third object of the present invention can be achieved by the commercial message management apparatus, wherein in the CM-inserted program, one or more of the pieces of pay-program video and audio data may have been cut out due to insertion of the pieces of commercial message data, and the cut pieces of pay-program video and audio data may be stored in a video and audio file apparatus that is identified by location information, and the program schedule transmitting unit may transmit the CM-deleted program schedule including the location information used to obtain the cut pieces of pay-program video and audio data.

Further, in the pay-program reception terminal, in the CM-inserted program, one or more of the pieces of pay-program video and audio data may have been cut out due to insertion of the pieces of commercial message data, and the CM-deleted program schedule may store location information of a video and audio file apparatus that stores the cut pieces of pay-program video and audio data, and the pay-program reception terminal may further include: a cut-data requesting unit for giving a cut-data request to obtain the cut pieces of pay-program video and audio data, to the video and audio file apparatus identified by the location information included in the CM-deleted program schedule; and a cut-data receiving unit for receiving the cut pieces of pay-program video and audio data transmitted from the video and audio file apparatus, and storing the received pieces of pay-program video and audio data into the program storing unit.

Further, the pay-program transmission and reception system may further include a video and audio file apparatus, in the CM-inserted program, one or more of the pieces of pay-program video and audio data may have been cut out due to insertion of the pieces of commercial message data, the video and audio file apparatus may be identified by location information, and may include: a receiving unit for receiving a cut-data request to obtain the cut pieces of pay-program video and audio data from the one of the pay-program reception terminals; and a video and audio data transmitting unit for transmitting the cut pieces of pay-program video and audio data to the one of the pay-program reception terminals in response to the cut-data request, the program schedule transmitting unit in the commercial message management apparatus may transmit the CM-deleted program schedule including the location information of the video and audio file apparatus from which the cut pieces of pay-program video and audio data can be obtained, and each pay-program reception terminal may further include: a cut-data requesting unit for giving the cut-data request to obtain the cut pieces of pay-program video and audio data, to the video and audio file apparatus identified by the location information stored in the CM-deleted program schedule; and a cut-data receiving unit for receiving the cut pieces of pay-program video and audio data transmitted from the video and audio file apparatus, and storing the received pieces of pay-program video and audio data into the program storing unit.

According to this construction, pieces of video/audio data that have been cut out due to insertion of pieces of CM data can be obtained by the video/audio file apparatus via the Internet. Therefore, it is needless to newly obtain the whole pay program.

The first object of the present invention can be achieved by a commercial message management method for managing a CM-inserted program that is a pay program into which commercial messages are inserted, and transmitting the CM-inserted program to a plurality of pay-program reception terminals, the method including: a program storing step of storing CM-inserted programs, to each of which a CM-inserted program schedule is attached, the CM-inserted program schedule showing a reproduction order of (a) pieces of pay-program video and audio data and (b) pieces of commercial message data; a program transmitting step of, when receiving a request for a pay program from one of the pay-program reception terminals, reading a CM-inserted program corresponding to the requested pay program and a CM-inserted program schedule attached thereto, from the program storing step, and transmitting the read CM-inserted program and the read CM-inserted program schedule, to the one of the pay program reception terminals; and a program schedule transmitting step of transmitting a CM-deleted program schedule showing a reproduction order of only the pieces of pay-program video and audio data to the one of the pay-program reception terminals, when receiving a CM deletion request to delete commercial messages from the requested pay program from the one of the pay-program reception terminals.

The first object of the present invention can also be achieved by a pay-program reception method for receiving a CM-inserted program that is a pay program into which commercial messages are inserted, from a commercial message management apparatus that manages the CM-inserted program, and reproducing the CM-inserted program, the method including: a transmission requesting step of giving a request for a pay program to the commercial message management apparatus; a program storing step of receiving a CM-inserted program corresponding to the requested pay program and a CM-inserted program schedule attached thereto that are transmitted from the commercial message management apparatus, the CM-inserted program schedule showing a reproduction order of (a) pieces of pay-program video and audio data and (b) pieces of commercial message data, and storing the received CM-inserted program and the received CM-inserted program schedule; a reproducing step of reproducing the pieces of pay-program video and audio data and the pieces of commercial message data, according to the reproduction order shown by the CM-inserted program schedule; a CM deletion requesting step of giving a CM deletion request to delete commercial messages from the requested pay program, to the commercial message management apparatus; and a program schedule storing step of receiving a CM-deleted program schedule that shows a reproduction order of only the pieces of pay-program video and audio data, and storing the received CM-deleted program schedule, wherein in the reproducing step, the pieces of pay-program video and audio data are reproduced according to the reproduction order shown by the CM-deleted program schedule, after the CM-deleted program schedule is stored in the program schedule storing step.

According to these methods, a viewer who wishes to delete CMs from a pay program is only required to newly obtain a program schedule corresponding to the pay program.

BRIEF DESCRIPTION OF THE DRAWINGS

These and other objects, advantages and features of the invention will become apparent from the following description thereof taken in conjunction with the accompanying drawings that illustrate a specific embodiment of the invention.

In the drawings:

FIG. 3 shows one example of a pay-program table managed by a pay-program table management unit in the first embodiment;

FIG. 5 shows one example of a CM-inserted program schedule in the first embodiment;

FIG. 6 shows one example of a program schedule for a pay program that is obtained before the schedule-attached CM-inserted program is generated by editing in the first embodiment;

FIG. 7 shows one example of a CM table listing CM data pieces managed by the CM data management apparatus;

FIG. 8 shows one example of a transmission count table managed by a transmission count unit in the first embodiment;

FIG. 9 shows one example of a pay-program receiving fee/advertisement fee table managed by the transmission count unit in the first embodiment;

FIG. 10 shows one example of an additional fee table managed by a CM viewing record management unit in the first embodiment;

FIG. 11 shows one example of a return fee calculation table managed by the CM viewing record management unit in the first embodiment;

FIG. 13 shows one example of a discounted additional fee table managed by a CM viewing record management unit in a pay-program transmission/reception system relating to a second embodiment of the present invention;

FIG. 15 shows one example of a CM-inserted program schedule for a schedule-attached CM-inserted program stored in a schedule-attached CM-inserted program server in a pay-program transmission/reception system relating to a third embodiment of the present invention;

FIG. 17 shows one example of a CM-inserted program schedule in a pay-program transmission/reception system relating to a fourth embodiment of the present invention;

FIG. 22 shows one example of a program schedule for a pay program that forms a basis of a schedule-attached CM-inserted program, in which CM data pieces are inserted, toe program schedule being managed by a CM data management apparatus;

FIG. 23 shows one example of a CM-inserted program schedule for a schedule-attached CM-inserted program in the sixth embodiment;

FIG. 24 shows one example of a uncut version program schedule stored in a schedule-attached CM-inserted program management unit in the sixth embodiment;

FIG. 26 shows one example of a CM-inserted program schedule in a pay-program transmission/reception system relating to a seventh embodiment of the present invention;

FIG. 28 shows one example of a CM-inserted program schedule in a pay-program transmission/reception system relating to an eighth embodiment of the present invention;

FIG. 29 shows one example of a viewing limitation table in a pay-program transmission/reception system relating to a ninth embodiment of the present invention.

DESCRIPTION OF THE PREFERRED EMBODIMENTS

The following describes preferred embodiments of a pay-program transmission/reception system relating to the present invention, with reference to the drawings.

(First Embodiment)

Figure 1:
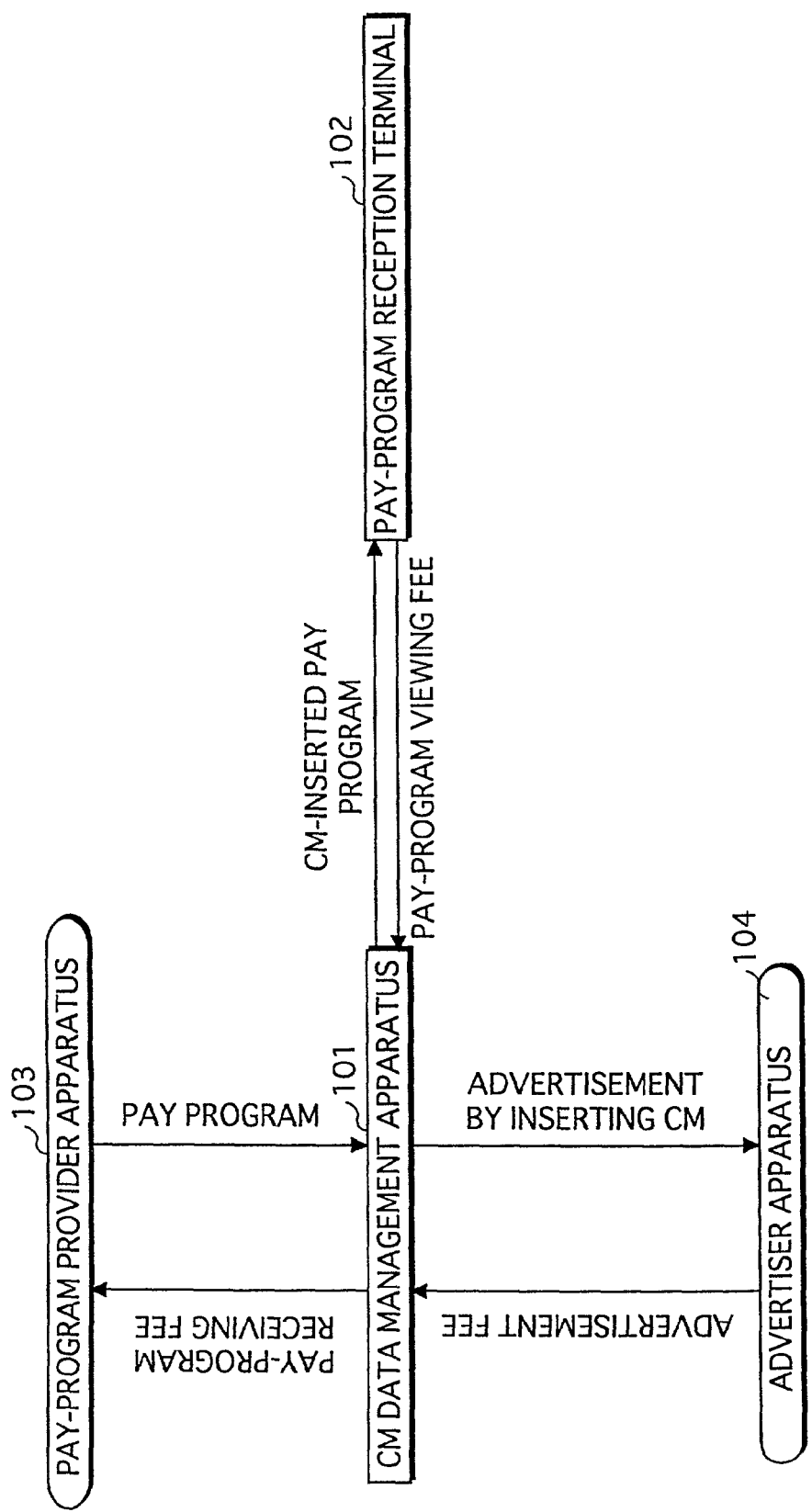
FIG. 1 is a conceptual diagram of a pay-program transmission/reception system relating to a first embodiment of the present invention.

FIG. 1 is a conceptual diagram of a pay-program transmission/reception system relating to a first embodiment of the present invention. The pay-program transmission/reception system includes a CM data management apparatus 101 and a pay-program reception terminal 102.

The CM data management apparatus 101 receives a pay program from a pay-program provider apparatus 103, and pays a pay-program receiving fee to a pay-program provider under the contract with the pay-program provider. The CM data management apparatus 101 collects an advertisement fee from an advertiser, and provides an advertisement by inserting CMs held by an advertiser apparatus 104 into the pay program.

Here, a "pay program" is constructed by video/audio data for movies, sports, news, and the like.

The pay-program reception terminal 102 obtains a pay program in which CMs are inserted (hereafter referred to as a "CM-inserted program") from the CM data management apparatus 101, views the CM-inserted program, and pays a pay-program viewing fee that is set as being reduced in accordance with the number of inserted CMs, to the CM data management apparatus 101.

Figure 2:
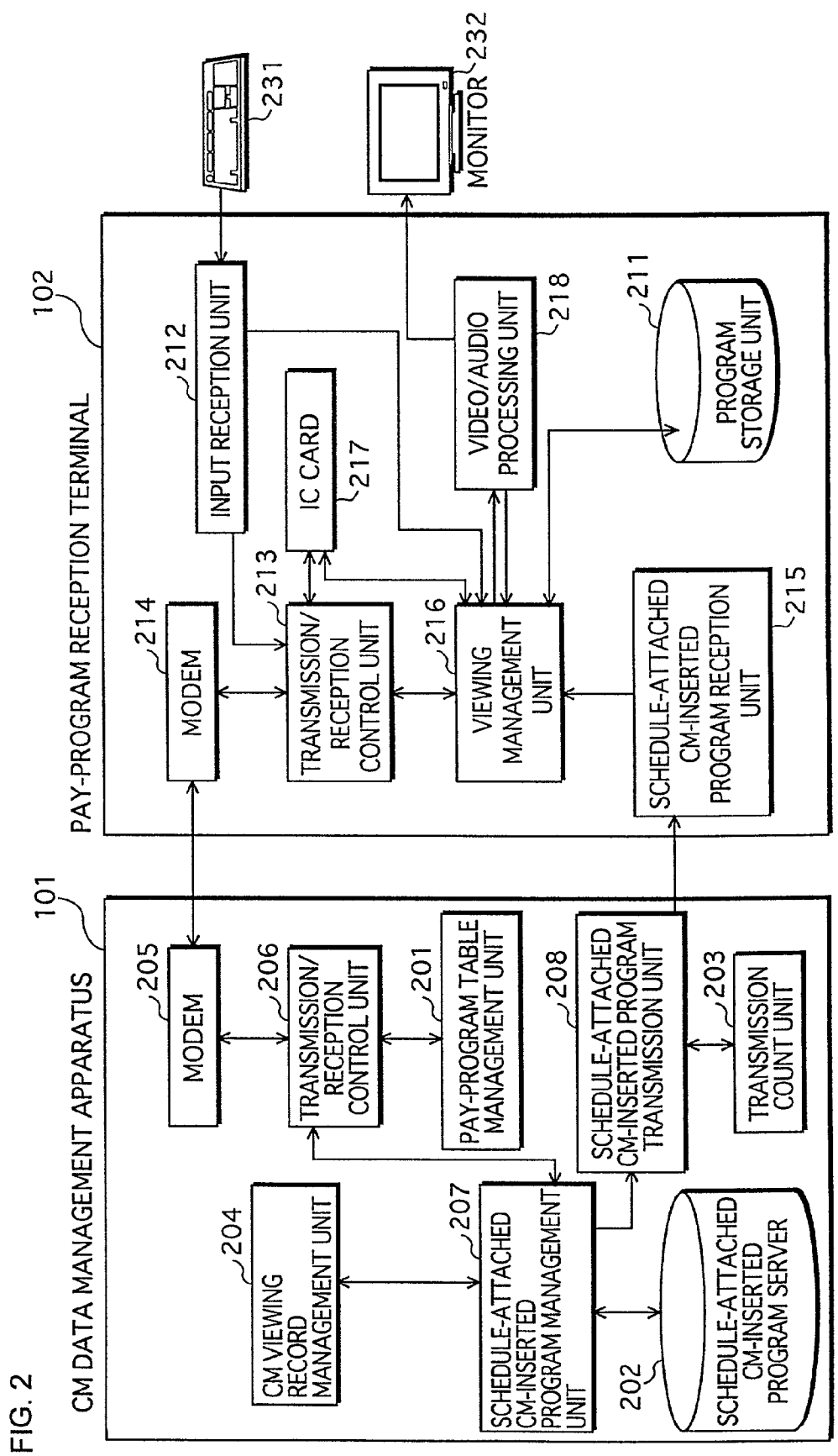
FIG. 2 is a construction diagram of the pay-program transmission/reception system relating to the first embodiment.

FIG. 2 is a construction diagram of this pay-program transmission/reception system. The pay-program transmission/reception system is mainly composed of the CM data management apparatus 101 and the pay-program reception terminal 102. The CM data management apparatus 101 includes a pay-program table management unit 201, a schedule-attached CM-inserted program server 202, a transmission count unit 203, a CM viewing record management unit 204, a modem 205, a transmission/reception control unit 206, a schedule-attached CM-inserted program management unit 207, and a schedule-attached CM-inserted program transmission unit 208. The pay-program reception terminal 102 includes a program storage unit 211, an input reception unit 212, a transmission/reception control unit 213, a modem 214, a schedule-attached CM-inserted program reception unit 215, a viewing management unit 216, an IC card 217, and a video/audio processing unit 218.

The input reception unit 212 receives an input operation from a viewer via an external keyboard or remote controller 231. The video/audio processing unit 218 outputs video/audio data to an external monitor 232.

The pay-program table management unit 201 stores a pay-program table that lists program names and viewing fees of CM-inserted programs that are stored in the schedule-attached CM-inserted program server 202 in the CM data management apparatus 101.

FIG. 3 shows one example of a pay-program table stored in the pay-program table management unit 201.

The pay-program table 301 includes a "program name" field 302 and a "viewing fee" field 303.

Upon receipt of a pay-program table request from the transmission/reception control unit 206, the pay-program table management unit 201 passes the stored pay-program table 301 to the transmission/reception control unit 206.

The schedule-attached CM-inserted program server 202 is constructed by a hard disc or the like. The schedule-attached CM-inserted program server 202 stores CM-inserted programs to each of which a CM-inserted program schedule is attached (hereafter referred to as a "schedule-attached CM-inserted program"). To be more specific, a schedule-attached CM-inserted program is composed of a CM-inserted program and a CM-inserted program schedule. The CM-inserted program is generated by inserting pieces of CM data before or after pieces of video/audio data that constitute a pay program. The CM-inserted program schedule shows the reproduction order of the pieces of video/audio data and the pieces of CM data.

Figure 4:
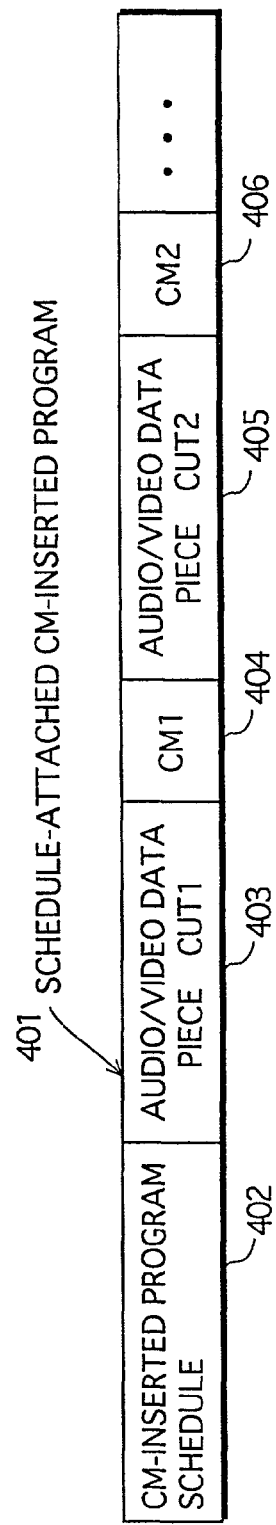
FIG. 4 shows one example of a data structure of a schedule-attached CM-inserted program stored in a schedule-attached CM-inserted program server in the first embodiment.

FIG. 4 shows a data structure of a schedule-attached CM-inserted program. The schedule-attached CM-inserted program 401 is composed of a CM-inserted program schedule 402 and a CM-inserted program. The CM-inserted program is made up of a video/audio data piece (CUT1) 403 and a video/audio data piece (CUT 2) 405, etc., that constitute the pay program, and a CM data piece (CM1) 404, a CM data piece (CM2) 406, etc.

The CM-inserted program schedule 402 includes, as FIG. 5 shows, a "program name" field 501, a "file ID" field 502, a "start point" field 503, and a "reproduction time period" field 504. The "file ID" field 502 shows a file ID for each video/audio data piece or for each CM data piece of the CM-inserted program. The file IDs are shown here in the reproduction order of the corresponding data pieces. The "start point" field 503 shows a start point of reproducing a video/audio data piece or a CM data piece identified by each file ID. The "reproduction time period" field 504 shows a reproduction time period of a video/audio data piece or a CM data piece identified by each file ID.

In the figure, the program name 501 is a program name of the this CM-inserted program. The file ID 502 is an identifier for identifying a file of each video/audio data piece or each CM data piece. The start point 503 is a start point at which reproduction of each video/audio data piece or each CM data piece is to be started. The reproduction time period 504 is a time period during which reproduction of each video/audio data piece or each CM data piece is to be continued. The start point 503 and the reproduction time period 504 are expressed in units of minutes or seconds, assuming that each video/audio data piece or each CM data piece is reproduced in a normal mode.

It should be noted here that the start point 503 and the reproduction time period 504 may instead be expressed by a frame number, relative data, or a byte number.

It should also be noted here that the schedule-attached CM-inserted program 401 has been generated by an editing unit (not shown) in the following way. The editing unit inserts pieces of CM data that are managed by the CM data management apparatus 101 before and after some of the pieces of video/audio data constituting the pay-program, with reference to the program schedule 601 shown in FIG. 6. The editing unit then replaces the program schedule 601 with the CM-inserted program schedule 402, to complete the schedule-attached CM-inserted program 401. The pieces of CM data to be inserted are selected from a plurality of pieces of CM data listed in the CM table shown in FIG. 7. Either linear editing or nonlinear editing can be used to realize this insertion of CM data pieces before or after the video/audio data pieces.

Also, after generating the schedule-attached CM-inserted program 401, the editing unit stores the program schedule 601 that forms a basis of the CM-inserted program schedule 402 into the schedule-attached CM-inserted program management unit 207.

The transmission count unit 203 calculates (a) a pay-program receiving fee to be paid to a pay-program provider and (b) an advertisement fee to be collected from an advertiser. For these calculation purposes, the transmission count unit 203 stores (a) a pay-program fee charged for one-time transmission of each pay program and (b) an advertisement fee charged for one-time transmission of each CM data piece.

Every time when the schedule-attached CM-inserted program transmission unit 208 transmits a schedule-attached CM-inserted program to the pay-program reception terminal 102 or the like, the transmission count unit 203 refers to a CM-inserted program schedule and counts the number of times the corresponding pay program and CM data pieces have been transmitted.

FIG. 8 shows one example of a transmission count table. The transmission count table 801 includes a "program/CM name" field 802 and a "transmission number" field 803. The "transmission number" field 803 shows the number of times a pay program or a CM data piece corresponding to a name shown in the "program/CM name" field 802 is transmitted to the pay-program reception terminal 102 or the like.

The transmission count unit 203 counts the number of times each pay-program and each CM data piece stored in the transmission count table 801 has been transmitted, and calculates at predetermined time intervals, e.g., every day, a pay-program receiving fee and an advertisement fee using the following equation (1).

$$\text{pay-program receiving fee/advertisement fee} = \text{the number of times a pay-program/CM has been transmitted to the pay-program reception terminal} * \text{one-time transmission fee} \quad \text{Equation (1)}$$

FIG. 9 shows one example of calculation results of a pay-program receiving fee or an advertisement fee.

A pay-program receiving fee/advertisement fee table 901 includes a "total transmission number" field 903 showing a total number of times a pay program or a CM has been transmitted to the pay-program reception terminal 102 or the like, a "one-time transmission fee" field 904, and a "pay-program receiving fee/advertisement fee" field 905, in correspondence to a "program/CM name" field 902.

A pay-program receiving fee calculated using this table is paid to a provider of the corresponding pay program via a payment apparatus that is not shown. An advertisement fee calculated using this table is collected from an advertiser of the corresponding CM via a billing apparatus that is not shown.

It should be noted here that although a pay-program receiving fee/advertisement fee is calculated based on the transmission number of the schedule-attached CM-inserted program to the pay-program reception terminal 102 or the like, it maybe calculated based on the number of times the CM-inserted program has been viewed by a viewer using the pay-program reception terminal 102 or the like.

The CM viewing record management unit 204 manages an additional fee table for each of the pay-program reception terminal 102 and the like. Also, the CM viewing record management unit 204 manages a return fee calculation table in which a return fee of an advertisement fee arising from not reproducing a CM data piece is calculated. For these calculation purposes, the CM viewing record management unit 204 stores (a) a fee for deleting one CM data piece that is used to determine an additional fee on a viewing fee of the schedule-attached CM-inserted program and (b) a fee for deleting one CM data piece that is used to determine a return fee of an advertisement fee.

Upon receipt of a CM deletion request from the schedule-attached CM-inserted program management unit 207, the CM viewing record management unit 204 calculates an additional fee and writes the calculated additional fee into the additional fee table for the pay-program reception terminal 102 or the like.

FIG. 10 shows one example of an additional fee table managed by the CM viewing record management unit 204.

The additional fee table 1001 includes a "pay-program reception terminal ID" field 1002 showing an ID that identifies the pay-program reception terminal 102 or the like with which a viewer wishes to reproduce a pay program without CMs, a "program name" field 1003 showing a name of the pay program, a "CM name" field 1004 showing names of CMs to be deleted, a "deletion number" field 1005, a "one-time deletion fee" field 1006, and an "additional fee" field 1007 showing an additional fee calculated using the equation (2) given below.

The pay-program reception terminal ID 1002 is passed from the schedule-attached CM-inserted program management unit 207 together with the CM deletion request. The program name 1003 and the CM name 1004 are stored in a CM-inserted program schedule. The deletion number 1005 is counted using the CM-inserted program schedule. The one-time deletion fee 1006 is set in advance. The equation (2) is given as follows.

$$\text{additional fee} = \Sigma(\text{deletion number} * \text{one-time deletion fee}) \quad \text{Equation (2)}$$

The CM viewing record management unit 204 calculates the additional fee 1007 using the equation (2), and writes the resulting value into the additional fee table. The CM viewing record management unit 204 then passes the pay-program reception terminal ID 1002 and the additional fee 1007 to the schedule-attached CM-inserted program management unit 207. When receiving a message indicating an agreement on the CM deletion from the schedule-attached CM-inserted program management unit 207, the CM viewing record management unit 204 adds the deletion number of each CM data piece stored in the additional fee table 1001 into the corresponding "total deletion number" field of a return fee calculation table that is described later.

When receiving a message indicating a disagreement on the CM deletion from the schedule-attached CM-inserted program management unit 207, the CM viewing record management unit 204 deletes the line corresponding to this additional fee 1007 in the additional fee table 1001.

The additional fee 1007 is added to the viewing fee for each of the pay-program reception terminal 102 and the like, and is collected from the viewer via the billing apparatus (not shown).

FIG. 11 shows one example of the return fee calculation table managed by the CM viewing record management unit 204.

The return fee calculation table 1101 includes a "CM name" field 1102 showing a name of a deleted CM data piece, a "total deletion number" field 1103, a "one-time deletion fee" field 1104, and a "return fee" field 1105. When receiving a message indicating an agreement on the CM deletion from the schedule-attached CM-inserted program management unit 207, the CM viewing record management unit 204 adds a value written in the "deletion number" field 1005 corresponding to the agreed CM deletion in the additional fee table 1001, into the corresponding "total deletion number" field 1103.

The CM viewing record management unit 204 calculates the return fee 1105 for each CM data piece at predetermined time intervals, e.g., everyday, using the following equation (3).

$$\text{return fee} = \text{total deletion number} * \text{one-time deletion fee} \quad \text{Equation (3)}$$

The return fee 1105 is returned to an advertiser of the deleted CM data piece via the payment apparatus that is not shown. It should be noted here that the return fee 1105 may be deducted from an advertisement fee to be paid by the advertiser, and the resulting advertisement fee may be collected from the advertiser.

Also, although the one-time deletion fee 1006 in the additional fee table 1001 and the one-time deletion fee 1104 in the return fee calculation table 1101 are set at the same values, they may be set at different values.

The modem 205 is connected via a public line network to the modem 214 for each of a plurality of pay-program reception terminals. Upon receipt of a request for transmitting a pay-program table from one of the pay-program reception terminals (the pay-program reception terminal 102), the modem 205 passes a pay-program reception terminal ID of the pay-program reception terminal 102 and the pay-program table request to the transmission/reception control unit 206. Upon receipt of the pay-program table 301 from the transmission/reception control unit 206, the modem 205 transmits, via a public line network, the pay-program table 301 to the pay-program reception terminal 102 that has given the pay-program table request.

Upon receipt of a program request including a program name from the pay-program receiving terminal 102, the modem 205 passes the program request to the transmission/reception control unit 206.

Also, upon receipt of a CM deletion request together with the pay-program reception terminal ID and the program name from the pay-program reception terminal 102, the modem 205 passes the CM deletion request to the transmission/reception control unit 206. Upon receipt of the pay-program reception terminal ID of the pay-program reception terminal that has given the pay-program table request and a notification of an additional fee from the transmission/reception control unit 206, the modem 205 transmits the notification of the additional fee to the pay-program reception terminal 102 via a public line network.

Upon receipt of a message indicating an agreement on the CM deletion or a message indicating a disagreement on the CM deletion from the pay-program reception terminal 102, the modem 205 passes the received agreement or disagreement message to the transmission/reception control unit 206. P Upon receipt of the program schedule 601 from the transmission/reception control unit 206, the modem 205 transmits the program schedule 601 to the pay-program reception terminal 102 that has given the agreement message. Upon receipt of the request for transmitting the pay-program table from the modem 205, the transmission/reception control unit 206 passes the request for transmitting the pay-program table 301 to the pay-program table management unit 201. Upon receipt of the pay-program table 301 from the pay-program table management unit 201, the transmission/reception control unit 206 instructs the modem 205 to transmit the pay-program table 301 to the pay-program reception terminal 102 that has given the pay-program table request.

Upon receipt of the program request including the program name from the modem 205, the transmission/reception control unit 206 passes the program request to the schedule-attached CM-inserted program management unit 207.

Upon receipt of the CM deletion request together with the pay-program reception terminal ID and the program name from the modem 205, the transmission/reception control unit 206 passes the CM deletion request to the schedule-attached CM-inserted program management unit 207 together with the pay-program reception terminal ID and the program name. Upon receipt of the notification of the additional fee arising from the CM deletion and the pay-program reception terminal ID from the schedule-attached CM-inserted program management unit 207, the transmission/reception control unit 206 passes the notification of the additional fee and the pay-program reception terminal ID to the modem 205.

Upon receipt of the message indicating an agreement on the CM deletion or the message indicating a disagreement on the CM deletion from the modem 205, the transmission/reception control unit 206 passes the received agreement or disagreement message to the schedule-attached CM-inserted program management unit 207. Upon receipt of the program schedule 601 in which the reproduction order of CM data pieces is not shown, and the pay-program reception terminal ID from the schedule-attached CM-inserted program management unit 207, the transmission/reception control unit 206 passes the received program schedule 601 and the pay-program reception terminal ID to the modem 205.

Upon receipt of the program request including the program name from the transmission/reception control unit 206, the schedule-attached CM-inserted program management unit 207 reads, from the schedule-attached CM-inserted program server 202, a schedule-attached CM-inserted program including this program name, and passes the read schedule-attached CM-inserted program to the schedule-attached CM-inserted program transmission unit 208.

For example, when a program request for "MOVIE 1" is given, the schedule-attached CM-inserted program management unit 207 reads a schedule-attached CM-inserted program 401 corresponding to the "CM-inserted MOVIE 1", and passes the read schedule-attached CM-inserted program 401 to the schedule-attached CM-inserted program transmission unit 208.

Upon receipt of the CM deletion request from the transmission/reception control unit 206, the schedule-attached CM-inserted program management unit 207 passes the CM deletion request to the CM viewing record management unit 204 together with the pay-program reception terminal ID and the CM-inserted program schedule identified by the program name. Upon receipt of the pay-program reception terminal ID and the notification of the additional viewing fee from the CM viewing record management unit 204, the schedule-attached CM-inserted program management unit 207 passes the pay-program reception terminal ID and the notification of the additional viewing fee to the transmission/reception control unit 206.

Upon receipt of the pay-program reception terminal ID and the message indicating an agreement on the CM deletion from the transmission/reception control unit 206, the schedule-attached CM-inserted program management unit 207 passes the received pay-program reception terminal ID and the agreement message to the CM viewing record management unit 204. At the same time, the schedule-attached CM-inserted program management unit 207 instructs the transmission/reception control unit 206 to transmit the program schedule in which the reproduction order of CM data pieces is not shown, which corresponds to the CM-inserted program schedule, to the pay-program reception terminal 102.

Upon receipt of the message indicating a disagreement on the CM deletion from the transmission/reception control unit 206, the schedule-attached CM-inserted program management unit 207 passes the disagreement message to the CM viewing record management unit 204.

Upon receipt of the schedule-attached CM-inserted program from the schedule-attached CM-inserted program management unit 207, the schedule-attached CM-inserted program transmission unit 208 transmits the schedule-attached CM-inserted program, via a broadcast wave, to the schedule-attached CM-inserted program reception unit 215 in the pay-program reception terminal 102 that has given the program request.

The following describes the construction of the pay-program reception terminal 102.

The program storage unit 211 is constructed by a hard disc or the like. The program storage unit 211 stores, via the viewing management unit 216, a schedule-attached CM-inserted program received by the schedule-attached CM-inserted program reception unit 215.

The input reception unit 212 receives an operation of a viewer via an external remote controller or keyboard 231, and passes the operation contents to the transmission/reception control unit 213 or to the viewing management unit 216.

Upon receipt of a request for a pay-program table from a viewer, the input reception unit 212 passes the request to the transmission/reception control unit 213.

Also, upon receipt of a selection of a pay program name and a request for a pay program with the selected program name from the viewer, the input reception unit 212 passes the program name to the transmission/reception control unit 213.

Upon receipt of a CM deletion request from the viewer, the input reception unit 212 passes it to the transmission/reception control unit 213. Upon receipt of a message indicating an agreement on the CM deletion or a message indicating a disagreement on the CM deletion from the viewer, the input reception unit 212 passes the received agreement or disagreement message to the transmission/reception control unit 213.

The transmission/reception control unit 213 passes the contents received from the input reception unit 212 to the modem 214. Here, the transmission/reception control unit 213 reads its own pay-program reception terminal ID from an IC card 217, and passes the read ID to the modem 214. Upon receipt the pay-program table from the modem 214, the transmission/reception control unit 213 passes it to the viewing management unit 216. Also, upon receipt of the notification of the additional fee arising from the CM deletion from the modem 214, the transmission/reception control unit 213 passes the notification of the additional fee to the viewing management unit 216. Further, upon receipt of the program schedule from the modem 214, the transmission/reception control unit 213 passes it to the viewing management unit 216.

The modem 214 is connected to the modem 205 in the CM data management apparatus 101 via a public line network. Upon receipt of the pay-program reception terminal ID, the request for the pay-program table, and the request for the pay program, and/or the CM deletion request, and/or the message indicating an agreement on the CM deletion or the message indicating a disagreement on the CM deletion from the transmission/reception control unit 213, the modem 214 transmits them to the modem 205.

Also, upon receipt of the pay-program table, the notification of the additional fee arising from the CM deletion, or the program schedule, from the CM data management apparatus 101, the modem 214 passes it to the transmission/reception control unit 213.

Upon receipt of a schedule-attached CM-inserted program transmitted from the CM data management apparatus 101, the schedule-attached CM-inserted program reception unit 215 passes the contents of the schedule-attached CM-inserted program to the viewing management unit 216.

Upon receipt of the pay-program table or the notification of the additional fee arising from the CM deletion from the transmission/reception control unit 213, the viewing management unit 216 passes them to the video/audio processing unit 218.

Upon receipt of the contents of the schedule-attached CM-inserted program from the schedule-attached CM-inserted program reception unit 215, the viewing management unit 216 stores the contents into the program storage unit 211. Upon receipt of an instruction to reproduce a program from the input reception unit 212, the viewing management unit 216 reads a CM-inserted program schedule for the schedule-attached CM-inserted program stored in the program storage unit 211. In accordance with the reproduction order shown by the read schedule, the viewing management unit 216 sequentially reads, from the program storage unit 211, pieces of video/audio data and pieces of CM data identified by file IDs, for the corresponding reproduction time period from the corresponding start point. The viewing management unit 216 then sequentially passes the read pieces of video/audio data and CM data to the video/audio processing unit 218.

Upon receipt of the program schedule from the transmission/reception control unit 213, the viewing management unit 216 stores it in its internal storage region. In this program schedule, the reproduction order of CM data pieces is not shown. In this case, when an instruction to reproduce a program is given from the input reception unit 212, the viewing management unit 216 sequentially reads, from the program storage unit 211, pieces of video/audio data identified by the file IDs, for the corresponding reproduction time period from the corresponding start point, in accordance with the reproduction order. The viewing management unit 216 then passes the read pieces of video/audio data to the video/audio processing unit 218.

Here, in a case where the pieces of video/audio data and the like have been scrambled, the viewing management unit 216 first descrambles the pieces of video/audio data and the like using a decryption key stored in the IC card 217, and then passes the pieces of video/audio data and the like to the video/audio processing unit 218.

The pay program reception terminal 102 stores its own pay-program reception terminal ID in the IC card 217 for an authentication purpose when giving a request for a pay-program table and the like to the CM data management apparatus 101. Also, the pay program reception terminal 102 stores the decryption key in the IC card 217 for descrambling pieces of video/audio data and the like in the case where the pieces of video/audio data and the like of a schedule-attached CM-inserted program transmitted from the CM data management apparatus 101 have been scrambled.

Upon receipt of the pay-program table from the viewing management unit 216, the video/audio processing unit 218 displays the pay-program table on the monitor 232, so that the viewer can select a program name and can request a program with the selected program name by operating the remote controller 231.

Also, upon receipt of a notification of an additional fee from the viewing management unit 216, the vide/audio processing unit 218 displays the additional fee on the monitor 232, so that the viewer can select one of agreement and disagreement on the CM deletion.

The video/audio processing unit 218 outputs the pieces of video/audio data of the pay-program and/or pieces of CM data passed from the viewing management unit 216 onto the external monitor 232.

The following describes the operations of the present embodiment, with reference to a sequence diagram (FIG. 12) of the CM data management apparatus 101 and the pay-program reception terminal 102.

First, in the pay-program reception terminal 102, the viewer operates the remote controller 231. The input reception unit 212 receives the viewer's operation, and the modem 214 gives a request for a pay-program table to the CM data management apparatus 101 (S1202).

In the CM data management apparatus 101, the modem 205 receives the request, and the pay-program table management unit 201 reads the pay-program table 301 (S1204).

The modem 205 transmits the pay-program table 301 passed via the transmission/reception control unit 206 to the pay-program reception terminal 102 (S1206).

The modem 214 in the pay-program reception terminal 102 receives the pay-program table 301. The video/audio processing unit 218 receives the pay-program table 301 via the transmission/reception control unit 213 and the viewing management unit 216, and displays the pay-program table 301 on the monitor 232 (S1208).

As one example, the viewer selects "MOVIE 1" from the pay-program table 301 using the remote controller 231. The modem 214 receives this viewer's selection via the input reception unit 212 and the transmission/reception control unit 213, and then gives a request for "MOVIE 1" to the CM data management apparatus 101 (S1210).

In the CM data management apparatus 101, the schedule-attached CM-inserted program management unit 207 receives the pay-program request via the modem 205 and the transmission/reception control unit 206, and reads a schedule-attached CM-inserted program 401 for the "CM-inserted MOVIE 1" stored in the schedule-attached CM-inserted program server 202. The schedule-attached CM-inserted program management unit 207 passes the read schedule-attached CM-inserted program 401 to the schedule-attached CM-inserted program transmission unit 208 (S1212). The schedule-attached CM-inserted program transmission unit 208 transmits, via a broadcast wave, the schedule-attached CM-inserted program 401 to the pay-program reception terminal 102 (S1214).

In the pay-program reception terminal 102, the schedule-attached CM-inserted program reception unit 215 receives the schedule-attached CM-inserted program 401. The schedule-attached CM-inserted program 401 is stored in the program storage unit 211 via the viewing management unit 216. The viewing management unit 216 is given a reproduction instruction from the viewer via the input reception unit 212, and then sequentially reads, from the program storage unit 211, pieces of video/audio data and pieces of CM data identified by the file IDs in the reproduction order according to the CM-inserted program schedule 402. The viewing management unit 216 passes the read pieces of data to the video/audio processing unit 218. The video/audio processing unit 218 outputs video and audio in which CMs are inserted onto the monitor 232 (S1216).

In a case where the viewer comes to like this pay program and wishes to view the pay-program without CMs, the viewer may give a CM deletion request by operating the remote controller 231. The input reception unit 212 receives this signal, and the modem 214 passes the CM deletion request to the CM data management apparatus 101 (S1218).

In the CM data management apparatus 101, the schedule-attached CM-inserted program management unit 207 receives the CM deletion request via the modem 205 and the transmission/reception control unit 206, and passes the CM-inserted program schedule 402 for the "CM-inserted MOVIE 1" to the CM viewing record management unit 204. The CM viewing record management unit 204 generates an additional fee table 1001 showing an additional fee arising from the CM deletion (S1220). The modem 205 receives a notification of the additional fee calculated using the additional fee table 1001 via the schedule-attached CM-inserted program management unit 207 and the transmission/reception control unit 206. The modem 205 transmits the notification of the additional fee to the pay-program reception terminal 102 (S1222).

In the pay-program reception terminal 102, the video/audio processing unit 218 receives the notification of the additional fee, and displays the additional fee on the monitor 232 (S1224). Upon looking at the additional fee, the viewer gives an indication to agree or disagree on the CM deletion, to the input reception unit 212 by operating the remote controller 231. The modem 214 passes the given indication of agreement or disagreement on the CM deletion, to the CM data management apparatus 101 (S1226).

In the CM data management apparatus 101, upon receipt of a message indicating an agreement on the CM deletion, the schedule-attached CM-inserted program management unit 207 passes the program schedule 601 corresponding to the CM-inserted program schedule 402 to the modem 205 via the transmission/reception control unit 206 (S1228). The modem 205 transmits the program schedule 601 to the pay-program reception terminal 102 (S1230).

In the pay-program reception terminal 102, the viewing management unit 216 receives the program schedule 601 via the modem 214 and the transmission/reception control unit 213. Upon receipt of a reproduction instruction from the viewer, the viewing management unit 216 sequentially reads, from the program storage unit 211, pieces of video/audio data for the pay program identified by the file IDs in the reproduction order according to the program schedule 601. The viewing management unit 216 then passes the read pieces of video/audio data to the video/audio processing unit 218. The video/audio processing unit 218 outputs the received pieces of video/audio data to the monitor 232 (S1232).

As described above, in the present embodiment, the corresponding program schedule 601 in which the reproduction order of CM data pieces is not shown is transmitted to the pay-program reception terminal 102 when the viewer wishes to view the pay program without CMs. By doing so, such wishes of the viewer can be satisfied and only video/audio data pieces of the pay program can be reproduced, without requiring a schedule-attached pay program to be newly transmitted.

In the present embodiment, an additional fee arising from deletion of CMs can be calculated and collected from the viewer, and also, a return fee of an advertisement fee for the resulting loss of an advertisement opportunity can be calculated and returned to the advertiser.

It should be noted here that the present embodiment describes the case where schedule-attached CM-inserted programs, each of which is composed of a CM-inserted program and a CM-inserted program schedule, are stored in advance in the schedule-attached CM-inserted program server 202. Alternatively, a pay program and a program schedule may be provided from a program providing apparatus held by the pay-program provider 103 when a selection of a program name is received from the pay-program reception terminal 102, pieces of CM data may be inserted into the pay program to generate a CM-inserted program schedule, and then the generated CM-inserted program schedule may be transmitted to the pay-program reception terminal 102.

Also, although the present embodiment describes the case where an additional fee on a viewing fee is calculated in the CM data management apparatus 101 and a notification of the calculated additional fee is transmitted to the pay-program reception terminal 102, the additional fee and the viewing fee may also be calculated in the pay-program reception terminal 102.

In this case, when transmitting the schedule-attached CM-inserted program 401, the CM data management apparatus 101 transmits the additional fee table 1001 shown in FIG. 10 from which the "pay-program reception terminal ID" field 1002 is deleted. Here, the "deletion number" field 1005 and the "additional fee" field 1007 are blank.

In the pay-program reception terminal 102, the viewing management unit 216 receives and stores this additional fee table. Upon receipt of a name of a CM to be deleted from the input reception unit 212, the viewing management unit 216 stores the deletion number, and calculates an additional fee arising from this CM deletion using the above equation (2). The viewing management unit 216 passes a notification of the calculated additional fee to the video/audio processing unit 218. The video/audio processing unit 218 displays the additional fee on the monitor 232.

As described above, the viewer can know an additional viewing fee, without waiting to receive a notification of the additional viewing fee from the CM data management apparatus 101.

Also, although the present embodiment describes the case where a CM-inserted program and a CM-inserted program schedule are combined and stored as a schedule-attached CM-inserted program in the schedule-attached CM-inserted program server 202, the CM-inserted program and the CM-inserted program schedule may be stored separately.

(Second Embodiment)

The following describes a pay-program transmission/reception system relating to a second embodiment of the present embodiment.

The present embodiment is the same as the first embodiment except a method for calculating an additional fee arising from CM deletion to be charged on the viewer. Accordingly, the present embodiment is described focusing only on its unique construction, with reference to the construction diagram referred to in the first embodiment (FIG. 2).

When passing the CM data piece (CM1) 404 and the CM data piece (CM2) 406 of the schedule-attached CM-inserted program 401 to the video/audio processing unit 218, the viewing management unit 216 in the pay-program reception terminal 102 counts, for each CM name, the number of times each CM data piece is transmitted (this transmission number is regarded as the "viewing number").

Upon receipt of a CM deletion request via the remote controller 231, the input reception unit 212 passes the CM deletion request not only to the transmission/reception control unit 213 but also to the viewing management unit 216. Upon receipt of the CM deletion request, the viewing management unit 216 passes a CM name of a CM to be deleted, and the number of times the CM has been viewed, to the transmission/reception control unit 213. The transmission/reception control unit 213 passes the CM deletion request including the CM name and the viewing number, to the modem 214.

The CM viewing record management unit 204 in the CM data management apparatus 101 stores a discounted additional fee table.

FIG. 13 shows one example of the discounted additional fee table. The discounted additional fee table 1301 differs from the additional fee table 1001 in the first embodiment, in that a "CM viewing number" field 1302 and a "one-time viewing discount" field 1303 are additionally provided.

The CM viewing record management unit 204 stores the one-time viewing discount 1303 set in advance for viewing a CM one time. The CM viewing number 1302 is passed from the schedule-attached CM-inserted program management unit 207 together with the CM deletion request.

The CM viewing record management unit 204 calculates the discounted additional fee 1304 using the following equation (4).

$$\text{discounted additional fee} = \Sigma(\text{deletion number} * \text{one-time deletion fee}) - \Sigma(\text{viewing number} * \text{one-time viewing discount}) \quad \text{Equation (4)}$$

Figure 14:
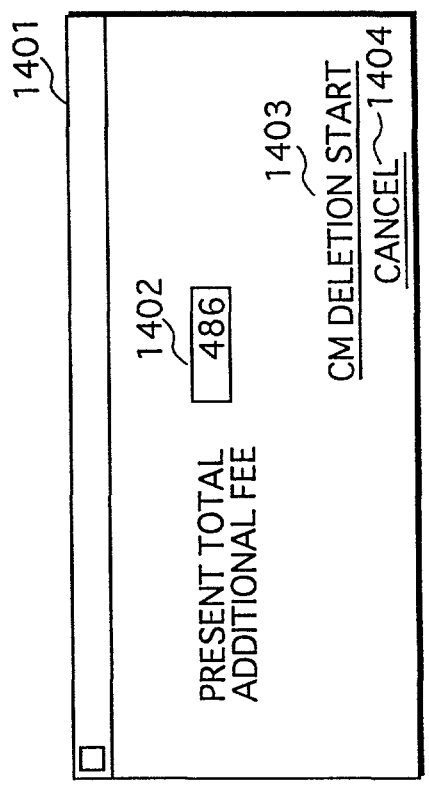
FIG. 14 shows one example of a screen displayed on an external monitor in the second embodiment.

Upon receipt of a notification of the discounted additional fee 1304 from the viewing management unit 216, the video/audio processing unit 218 in the pay-program reception terminal 102 displays the discounted additional fee on the external monitor 232 as shown in FIG. 14.

On a screen 1401, a present total additional fee 1402 "486 yen", a CM deletion start (agreement) button 1403, and a cancel (disagreement) button 1404 are displayed. The viewer selects the CM deletion start button 1403 using the remote controller 231 when agreeing on the CM deletion with this discounted additional fee 1402. When disagreeing on the CM deletion, the viewer selects the cancel button 1404 using the remote controller 231.

In the present embodiment, an additional fee arising from CM deletion is discounted in accordance with the number of CMs that the viewer has viewed. Accordingly, when the viewer wishes to view a pay program without CMs after obtaining the schedule-attached CM-inserted program, an additional fee arising from the CM deletion can be discounted. In this case, therefore, a viewing fee for the pay program without CMs can be made low as compared with a case where a no-CM version of the pay program is obtained in the first place. This can encourage the viewer to view CMs.

Here, although the present embodiment describes the case where a discounted additional fee is calculated in the CM viewing record management unit 204 in the CM data management apparatus 101, it may also be calculated in the pay-program reception terminal 102.

In this case, the CM data management apparatus 101 transmits the discounted additional fee table 1301 (FIG. 13) from which the "pay-program reception terminal ID" field 1002 is deleted, to the pay-program reception terminal 102 together with the schedule-attached CM-inserted program. Here, the "deletion number" field 1005, the "viewing number" field 1302, and the "discounted additional fee" field 1304 in the discounted additional fee table 1301 are blank.

The viewing management unit 216 in the pay-program reception terminal 102 counts the number of times each CM has been viewed, and writes the counted viewing number into the "viewing number" field 1302 in correspondence to its CM name. The viewing management unit 216 receives a CM name of a CM to be deleted from the input reception unit 212, and writes the deletion number of the CM. The discounted additional fee is calculated using the above equation (4). The viewing management unit 216 passes a notification of the calculated discounted additional fee to the video/audio processing unit 218.

The video/audio processing unit 218 displays the discounted additional fee on the monitor 232.

As described above, the viewer can know a discounted additional fee, without waiting to receive a notification of the discounted additional fee transmitted from the CM data management apparatus 101.

(Third Embodiment)

The following describes a pay-program transmission/reception system relating to a third embodiment of the present embodiment.

The present embodiment is the same as the first embodiment except that a CM to be deleted can be selected in the pay-program reception terminal. Accordingly, the present embodiment is described focusing only on its unique construction, with reference to the construction diagram referred to in the first embodiment (FIG. 2).

Upon receipt of a CM-inserted program schedule and a name of a CM to be deleted from the schedule-attached CM-inserted program management unit 207, the CM viewing record management unit 204 generates an additional fee table. Also, upon receipt of a message indicating an agreement on the selected CM deletion from the schedule-attached CM-inserted program management unit 207, the CM viewing record management unit 207 adds the deletion number of the CM with the CM name shown in the additional fee table, into the corresponding "total deletion number" field in the return fee calculation table. It should be noted here that unlike in the first embodiment, a notification of the additional fee is not passed to the schedule-attached CM-inserted program management unit 207 in the present embodiment.

Upon receipt of a selected CM deletion request, the schedule-attached CM-inserted program management unit 207 reads a one-time deletion fee of the selected CM included in the corresponding schedule-attached CM-inserted program stored in the CM viewing record management unit 204. The schedule-attached CM-inserted program management unit 207 passes the read one-time deletion fee to the modem 205 via the transmission/reception control unit 206.

Also, upon receipt of a CM name of the selected CM from the transmission/reception control unit 206, the schedule-attached CM-inserted program management unit 207 passes the selected CM name to the CM viewing record management unit 204 together with the CM-inserted program schedule.

Further, upon receipt of a message indicating an agreement on the selected CM deletion, the schedule-attached CM-inserted program management unit 207 generates a CM-inserted program schedule in which the reproduction order of the CM data identified by the selected CM name is not shown, and passes the generated CM-inserted program schedule to the modem 205 via the transmission/reception control unit 206. At the same time, the schedule-attached CM-inserted program management unit 207 passes the message indicating the agreement on the selected CM deletion to the CM viewing record management unit 204.

It should be noted here that the CM-inserted program schedule for the schedule-attached CM-inserted program shown in FIG. 5 is additionally provided with a "remark" field in the present embodiment. The "remark" field shows the contents of the CM data piece for a viewer's reference.

FIG. 15 shows one example of such a CM-inserted program schedule. The CM-inserted program schedule 1501 includes a "remark" field 1502 showing the contents of the corresponding CM data piece.

Upon receipt of a selected CM deletion request, the input reception unit 212 in the pay-program reception terminal 102 passes it to the transmission/reception control unit 213. Also, upon receipt of a selection of a CM name of a CM to be deleted, the input reception unit 212 passes the selected CM name to the transmission/reception control unit 213 and to the viewing management unit 216.

Upon receipt of the selected CM deletion request and the CM name of the CM to be deleted, the transmission/reception control unit 213 passes them to the modem 214.

The modem 214 transmits the CM deletion request and the CM name received from the transmission/reception control unit 213 to the CM data management apparatus 101.

Upon receipt of a notification of an additional fee for one-time deletion of the CM from the CM data management apparatus 101, the modem 214 passes the received notification to the viewing management unit 216 via the transmission/reception control unit 213.

The viewing management unit 216 passes the CM name and the additional fee of one-time CM deletion to the video/audio processing unit 218. Here, the viewing management unit 216 reads the CM-inserted program schedule 1501 stored in the program storage unit 211, and also, passes the contents written in the "remark" 1502 field to the video/audio processing unit 218.

Upon receipt of the CM name of the CM to be deleted from the input reception unit 212 via the transmission/reception control unit 213, the viewing management unit 216 counts the number of times the CM is to be deleted by referring to the CM-inserted program schedule 1501, calculates an additional fee using the following equation (5), and passes the CM name and the calculation result to the video/audio processing unit 218.

$$\text{additional fee} = \Sigma(\text{one-time deletion fee of selected CM} * \text{selected CM deletion number}) \quad \text{Equation (5)}$$

It should be noted here that the same calculation as above is also performed in the CM viewing record management unit 204 in the CM data management apparatus 101.

Upon receipt of the CM name, the one-time deletion fee, and the remark 1502 from the viewing management unit 216, the video/audio processing unit 218 displays a CM selection screen on the external monitor 232. Also, upon receipt of a selected CM name and a notification of an additional fee, the video/audio processing unit 218 displays the selected CM name and the additional fee beside a check box or the like on the CM selection screen.

Figure 16:
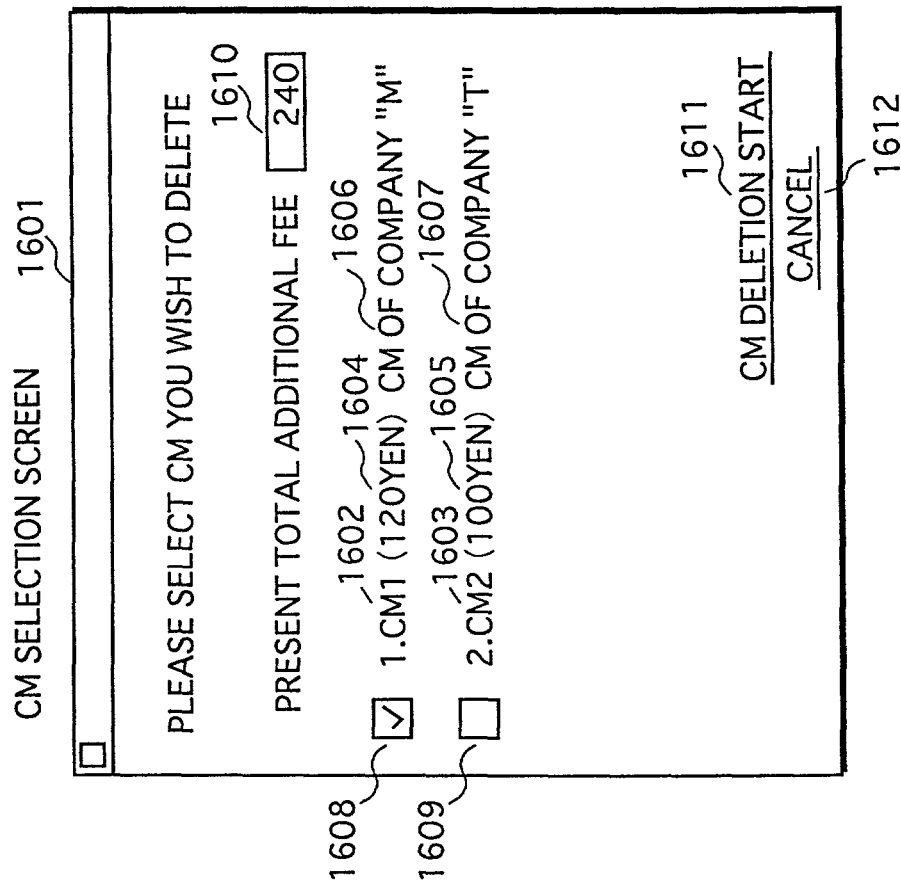
FIG. 16 shows one example of a screen for selecting a CM to be deleted, which is displayed on a monitor provided external to a pay-program reception terminal in the third embodiment.

FIG. 16 shows one example of the CM selection screen. On the CM selection screen 1601, CM names 1602 and 1063, one-time deletion fees 1604 and 1605, CM contents 1606 and 1607, and check boxes 1608 and 1609 for selection purposes are displayed. When one of the boxes 1608 and 1609 is checked, the present total additional fee 1610 is being displayed.

Also, on the CM selection screen 1601, a CM deletion start (agreement) button 1611 and a cancel (disagreement) button 1612 are displayed.

As described above, in the present embodiment, the viewer can select a CM to be deleted by referring to an additional fee arising from deleting each CM. This enables the viewer to view a pay program at a lower viewing fee by selectively deleting some of the CMs inserted in the pay program.

(Fourth Embodiment)

The following describes a pay-program transmission/reception system relating to a fourth embodiment of the present embodiment.

The present embodiment differs from the first to third embodiments in that a program schedule in which the reproduction order of CMs is not shown is not transmitted from the CM data management apparatus 101 to the pay program reception terminal 102.

Due to this construction, the schedule-attached CM-inserted program management unit 207 that has received a message indicating an agreement on CM deletion simply passes a message indicating reception of the agreement message to the CM viewing record management unit 204. The schedule-attached CM-inserted program management unit 207 does not transmit a program schedule in which the reproduction order of CMs is not shown, to the pay-program reception terminal 102.

Therefore, the CM-inserted program schedule 1701 shown in FIG. 17 is generated by adding a "CM judgment" field 1702 and a "CM deletion judgment" field 1703 to the CM-inserted program schedule 402 (FIG. 5) in the first embodiment.

The "CM judgment" field 1702 shows a type of a file identified by a file ID for the "CM-inserted MOVIE 1", the type being either CM data or video/audio data. In the field, symbol "◯" indicates that the corresponding file is CM data.

The "CM deletion judgment" field 1703 shows whether each CM data piece has been deleted by the viewer's selection or not. In this field, symbol "◯" indicates that the corresponding CM data piece has been deleted.

The schedule-attached CM-inserted program server 202 stores schedule-attached CM-inserted programs, each of which is composed of a CM-inserted program schedule 1701 and video/audio data pieces of a pay program in which pieces of CM data are inserted.

Upon receipt of a program request including a program name from the transmission/reception control unit 206, the schedule-attached CM-inserted program management unit 207 reads a schedule-attached CM-inserted program including the CM-inserted program schedule 1701. The schedule-attached CM-inserted program management unit 207 passes the read schedule-attached CM-inserted program to the schedule-attached CM-inserted program transmission unit 208. The schedule-attached CM-inserted program transmission unit 208 transmits, via a broadcast wave, the schedule-attached CM-inserted program to the pay-program reception terminal 102 that has given the program request.

The schedule-attached CM-inserted program reception unit 215 receives the schedule-attached CM-inserted program, and the viewing management unit 216 stores it into the program storage unit 211.

When the schedule-attached CM-inserted program is stored in the program storage unit 211, an initial state of the "CM deletion judgment" field 1703 in the CM-inserted program schedule 1701 shows symbol "x" corresponding to symbol "○" in the "CM judgment" 1702 field, indicating that this is a CM data piece that has not been deleted, and it shows symbol "—" corresponding to symbol "x" in the "CM judgment" field 1702, indicating that this data piece cannot be judged.

Here, the "remark" field 1502 mentioned in the third embodiment (FIG. 15) may also be provided in the CM-inserted program schedule 1701. By doing so, the viewer can refer to the contents of each piece of CM data when selecting a CM to be deleted.

As in the third embodiment, the monitor 232 may display the CM selection screen 1601, so that the viewer can select a CM to be deleted. Alternatively, as in the first embodiment, the viewer may give a CM deletion request. Here, the viewing management unit 216 may use a file ID (CM name) to identify a piece of CM data selected to be deleted in the CM-inserted program schedule 1701 stored in the program storage unit 211, and may pass the file ID to the transmission/reception control unit 213. Upon receipt of the file ID, the modem 214 transmits the CM name to the CM data management apparatus 101 together with the CM deletion request.

Also, upon receipt of a notification of an additional fee calculated in the CM viewing record management unit 204 in the CM data management apparatus 101, the viewing management unit 216 passes the notification of the additional fee to the video/audio processing unit 218, and displays the additional fee on the monitor 232.

Upon receipt of a message indicating an agreement on the CM deletion or a message indicating a disagreement on the CM deletion from the input reception unit 212, the viewing management unit 216 passes a message indicating reception of the agreement or disagreement message to the modem 214 via the transmission/reception control unit 213. The modem 214 transmits the received message to the CM data management apparatus 101.

Figure 12:
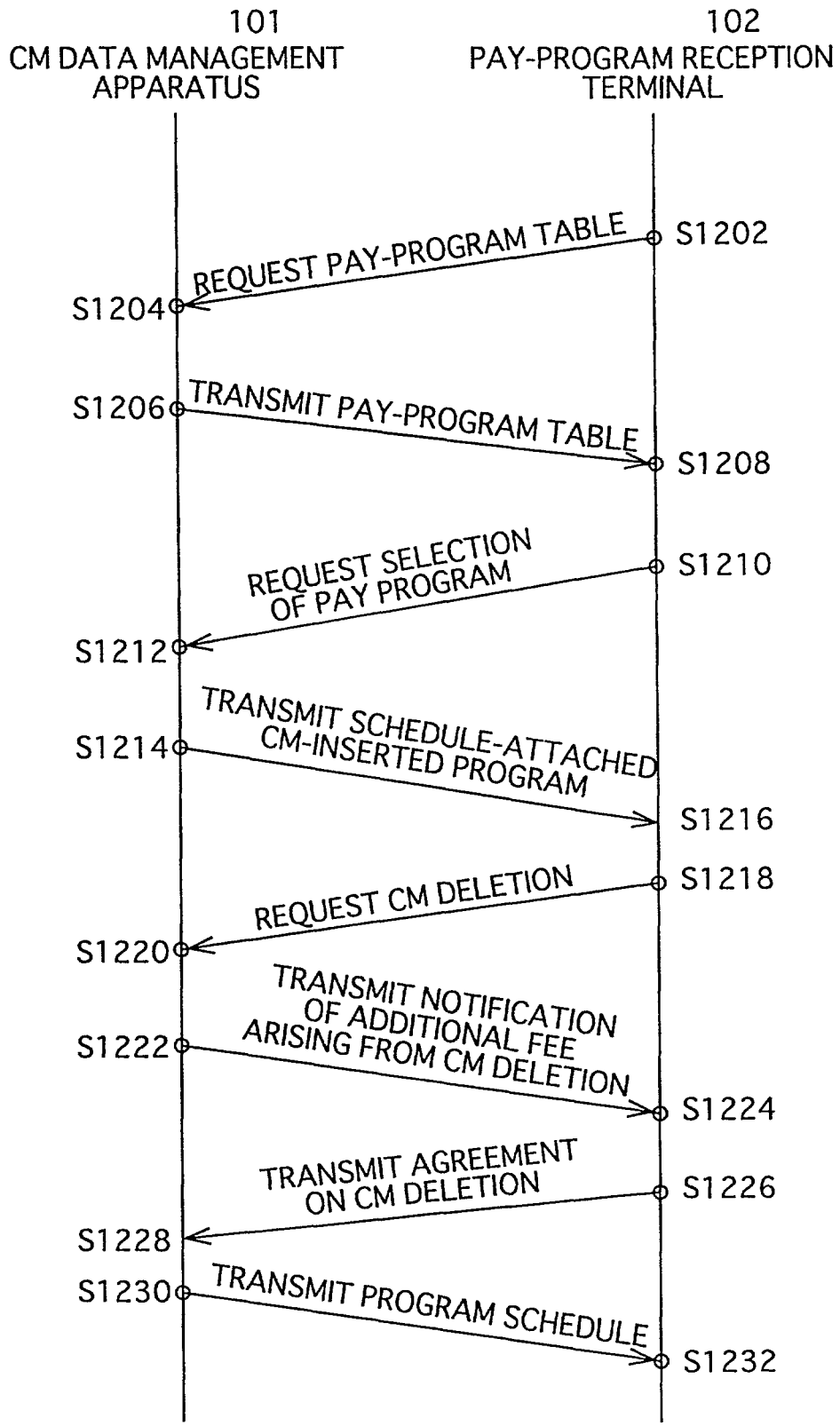
FIG. 12 shows one example of a sequence diagram showing the operations of the CM data management apparatus and the pay-program reception terminal in the first embodiment.

Upon receipt of the message indicating reception of the agreement message from the CM viewing record management unit 204 in the CM data management apparatus 101, the viewing management unit 216 transmits the message indicating reception of the agreement message to the pay-program reception terminal 102, instead of transmitting a program schedule as in S1230 in the sequence diagram in the first embodiment (FIG. 12).

Upon receipt of the message indicating reception of the agreement message, the viewing management unit 216 stores the CM-inserted program schedule 1701 of the schedule-attached CM-inserted program stored in the program storage unit 211 into its internal storage region, and updates the "CM deletion judgment" field 1703 corresponding to the selected CM from "x" to "○".

The CM-inserted program schedule 1701 shows a case where deletion of a CM data piece with a file ID 502 being "CM2" is selected. The corresponding "CM deletion judgment" field 1703 shows "○".

When the viewing management unit 216 receives an instruction to reproduce a CM-inserted program shown by the CM-inserted program schedule 1701 stored in its internal storage region, the viewing management unit 216 reads video/audio data pieces and CM data pieces identified by file IDs stored in the program storage unit 211, in the reproduction order shown by the CM-inserted program schedule 1701. The viewing management unit 216 passes the read video/audio data pieces and CM data pieces to the video/audio processing unit 218. At this time, the viewing management unit 216 does not read a data piece whose "CM deletion judgment" 1703 field shows "○".

Figure 18:
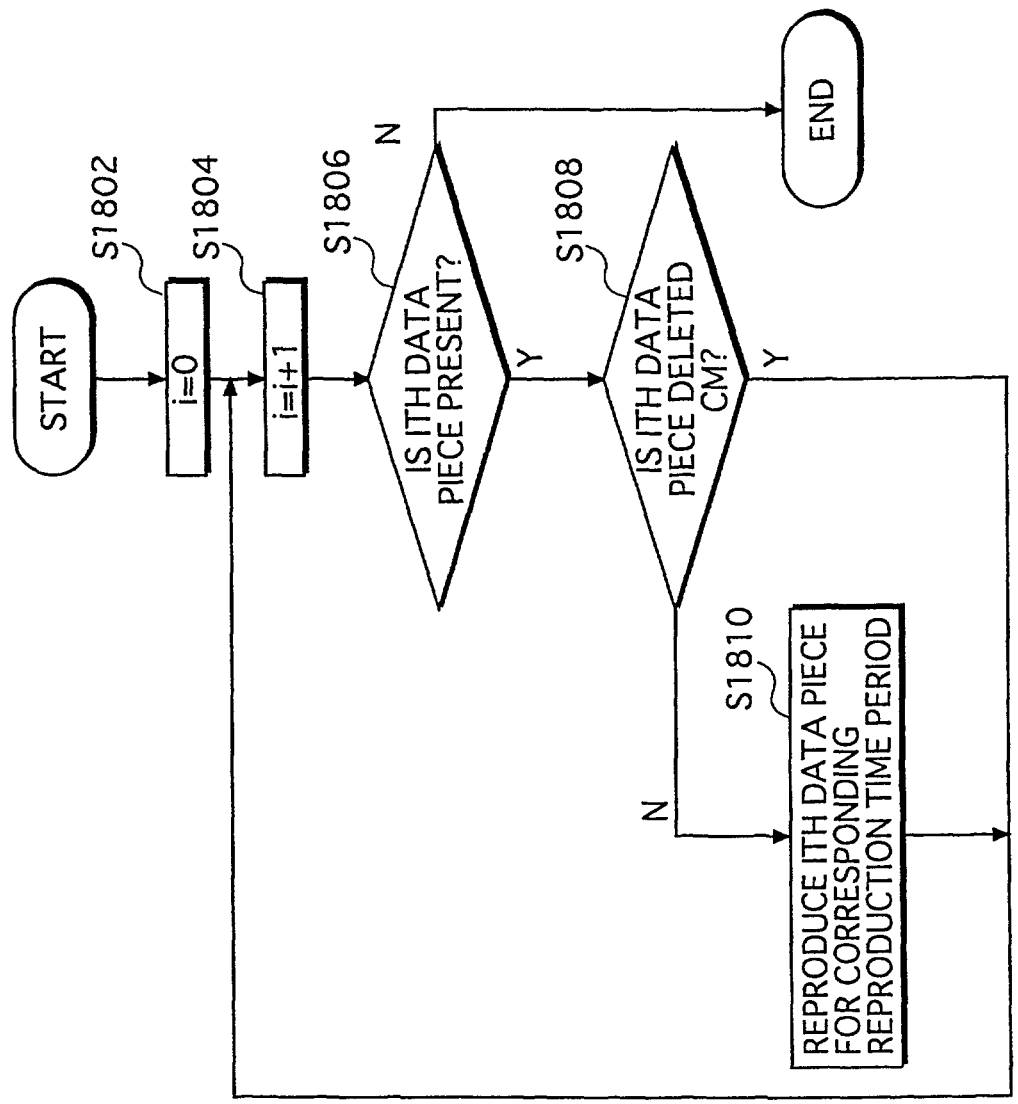
FIG. 18 is a flowchart showing the reproduction operations of a pay-program reception terminal in the fourth embodiment.

The following describes the reproduction operations of the schedule-attached CM-inserted program in the pay-program reception terminal 102, with reference to a flowchart in FIG. 18.

Upon receipt of a reproduction instruction, the viewing management unit 216 initializes counter i to "0" (S1802). The viewing management unit 216 adds "1" to counter i (S1804). The viewing management unit 216 then judges whether the ith data piece is present in the CM-inserted program schedule 1701 (S1806). When the ith data piece is present, the viewing management unit 216 judges whether the "CM deletion judgment" 1703 field corresponding to the ith data piece identified by the file ID shows "○", i.e., whether the ith data piece is a CM data piece that has been deleted (S1808). When the ith data piece is a CM data piece that has been deleted, the processing returns to S1804. When the ith data piece is not a CM data piece that has been deleted, the viewing management unit 216 reads, from the program storage unit 211, a video/audio data piece or a CM data piece identified by the ID file, for the corresponding reproduction time period from the corresponding start point. The viewing management unit 216 then passes the read data piece to the video/audio processing unit 218. The video/audio processing unit 218 outputs and reproduces the pay program on the external monitor 232 (S1810), and the processing returns to S1804. When the ith data piece is not present in S1806, the processing ends.

In the present embodiment, the CM-inserted program schedule 1701 is additionally provided with the "CM deletion judgment" field 1703. Based on whether a CM has been deleted or not by referring to this "CM deletion judgment filed" 1703, the schedule-attached CM-inserted program is reproduced. Therefore, transmission of a program schedule from the CM data management apparatus 101 to the pay-program reception terminal 102 does not need to be performed, thereby alleviating a burden on the viewer to obtain the program schedule.

(Fifth Embodiment)

The following describes a pay-program transmission/reception system relating to a fifth embodiment of the present embodiment.

Figure 19:
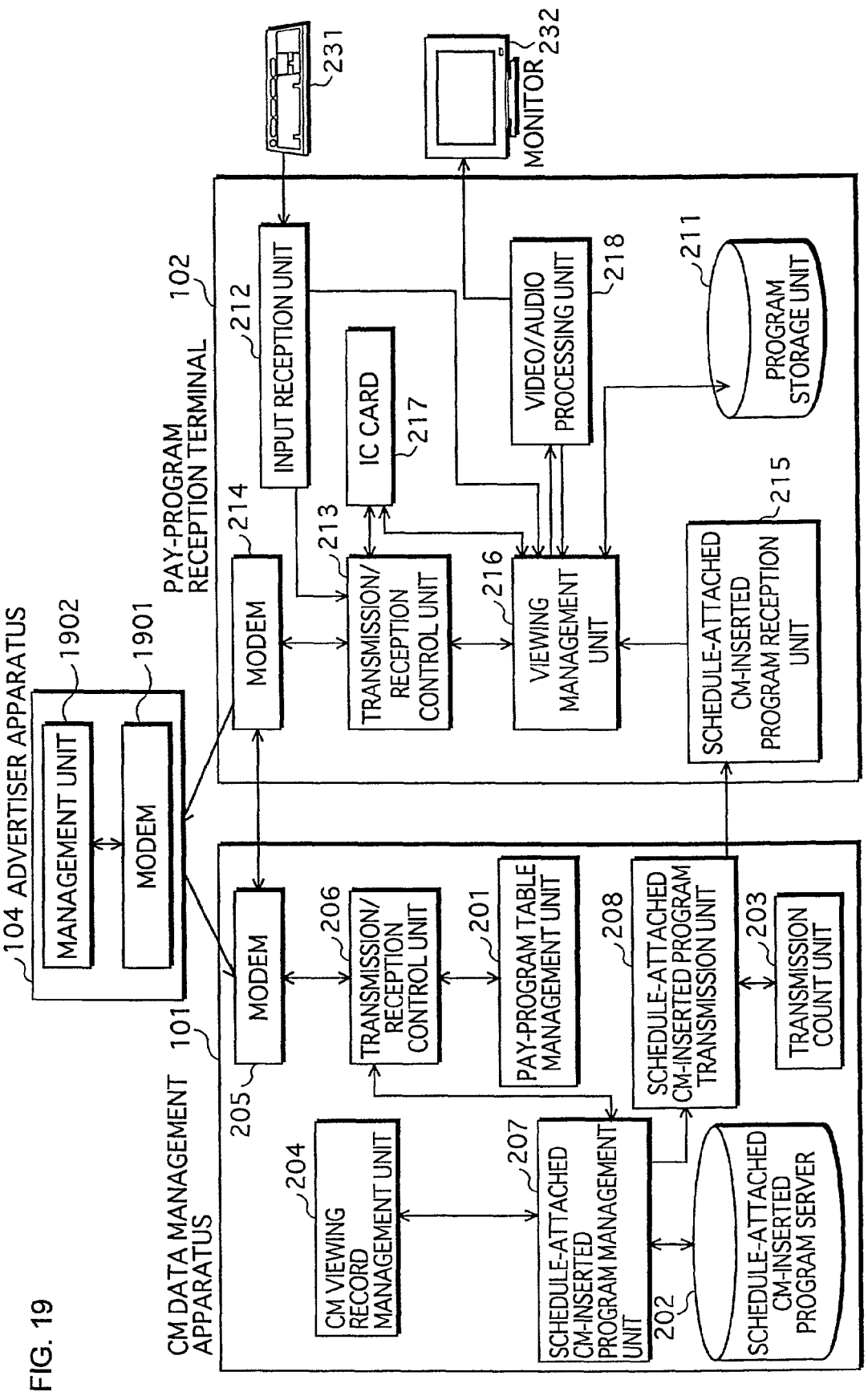
FIG. 19 is a construction diagram of a pay-program transmission/reception system relating a fifth embodiment of the present invention.

FIG. 19 is a construction diagram of the fifth embodiment. In the present embodiment, an advertiser apparatus is additionally provided in the construction diagram of the fourth embodiment (FIG. 2).

The advertiser apparatus 104 includes a modem 1901 and a management unit 1902. The modem 1901 is connected to the modem 214 in the pay-program reception terminal 102 via a public line network or the Internet. The modem 1901 is also connected to the modem 205 in the CM data management apparatus 202 in the same way.

A viewer uses the pay-program reception terminal 102 to access the advertiser apparatus 104 that establishes a web page of an advertiser, and gives a purchase request for a CM product on the web page. Here, the pay-program reception terminal 102 transmits its own pay-program reception terminal ID and a program name of a schedule-attached CM-inserted program from the modem 214 to the modem 1901.

The management unit 1902 receives the pay-program reception terminal ID and the program name from the modem 1901. The management unit 1902 instructs the modem 1901 to transmit a CM name of the requested CM product, the pay-program reception terminal ID, and the program name of the schedule-attached CM-inserted program, to the modem 205 in the CM data management apparatus 101.

The modem 1901 transmits, as a CM deletion request, the CM name, the pay-program reception terminal ID, and the program name of the schedule-attached CM-inserted program, to the modem 205.

Upon receipt of the CM deletion request via the transmission/reception control unit 206, the schedule-attached CM-inserted program management unit 207 transmits, via the transmission/reception control unit 206 and the modem 205, the CM name of the CM that is permitted to be deleted and the program name, to the pay-program reception terminal 102 identified by the pay-program reception terminal ID.

Upon receipt of the CM name and the program name via the modem 214 and the transmission/reception control unit 213, the viewing management unit 216 reads a CM-inserted program schedule 1701 for the schedule-attached CM-inserted program, stores the read CM-inserted program schedule 1701 into its internal storage region, and updates the "CM deletion judgment" 1703 field corresponding to the CM that has been permitted to be deleted, from "×" to "○".

Figure 20:
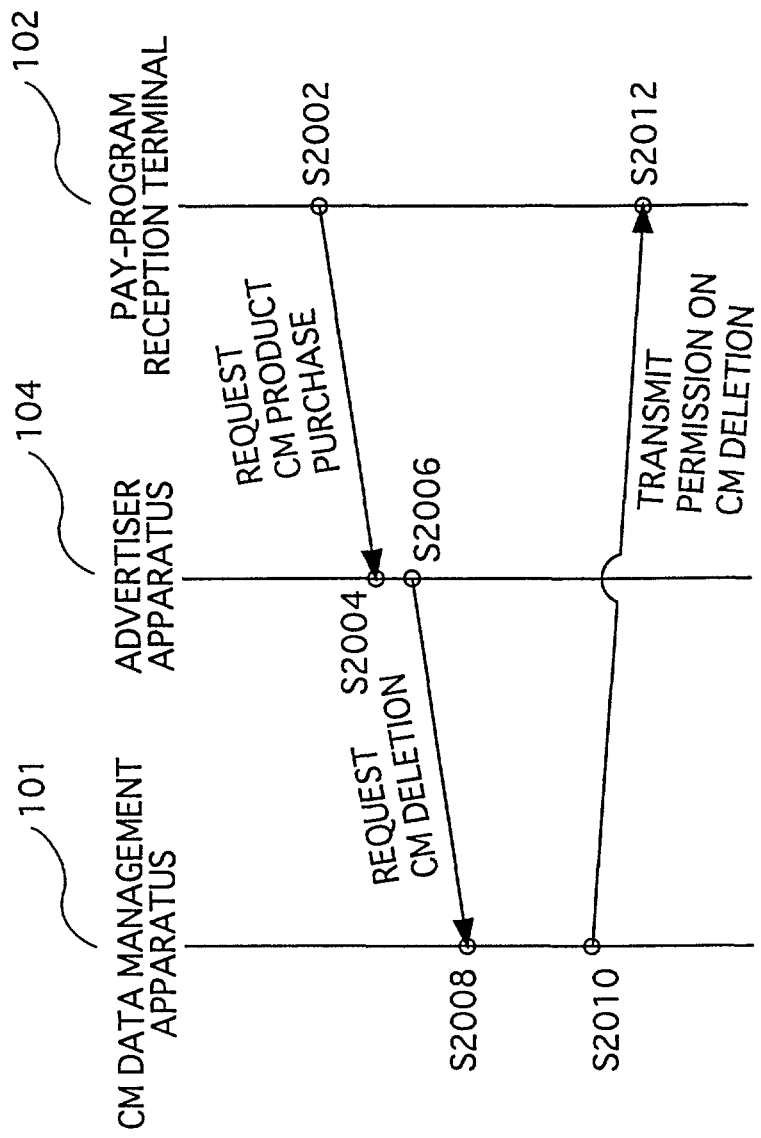
FIG. 20 is a sequence diagram showing the operations of a CM data management apparatus, an advertiser apparatus, and a pay-program reception terminal in the fifth embodiment.

The following describes the operations of the pay-program reception terminal 102, the advertiser apparatus 104, and the CM data management apparatus 101, with reference to a sequence diagram shown in FIG. 20.

The pay-program reception terminal 102 gives a purchase request for a CM product on a web page established by the advertiser apparatus 104 (S2002). The advertiser apparatus 104 receives the purchase request for the CM product (S2004), and gives, to the CM data management apparatus 101, a CM deletion request of the purchased CM product from the schedule-attached CM-inserted program (S2006).

The CM data management apparatus 101 transmits a permission on the CM deletion to the pay-program reception terminal 102 that has purchased the CM product (S2010).

In the pay-program reception terminal 102, the "CM deletion judgment" field 1703 corresponding to the CM that is permitted to be deleted in the CM-inserted program schedule 1701 is updated to "○" (S2012).

In the present embodiment, a viewer gives a purchase request for a CM product on a web page established by the advertiser apparatus 104. Alternatively, for example, a viewer may give a pay-program reception terminal ID of his or her pay program reception terminal and a program name of a schedule-attached CM-inserted program when purchasing a CM product at a sales agency of the advertiser, and the sales agency may transmit the given pay-program reception terminal ID and the program name to the CM data management apparatus.

In the present embodiment, service is provided for deleting a CM from a schedule-attached CM-inserted program when a viewer purchases the corresponding CM product, thereby encouraging the viewer to purchase CM products.

(Sixth Embodiment)

The following describes a pay-program transmission/reception system relating to a sixth embodiment of the present embodiment.

Figure 21:
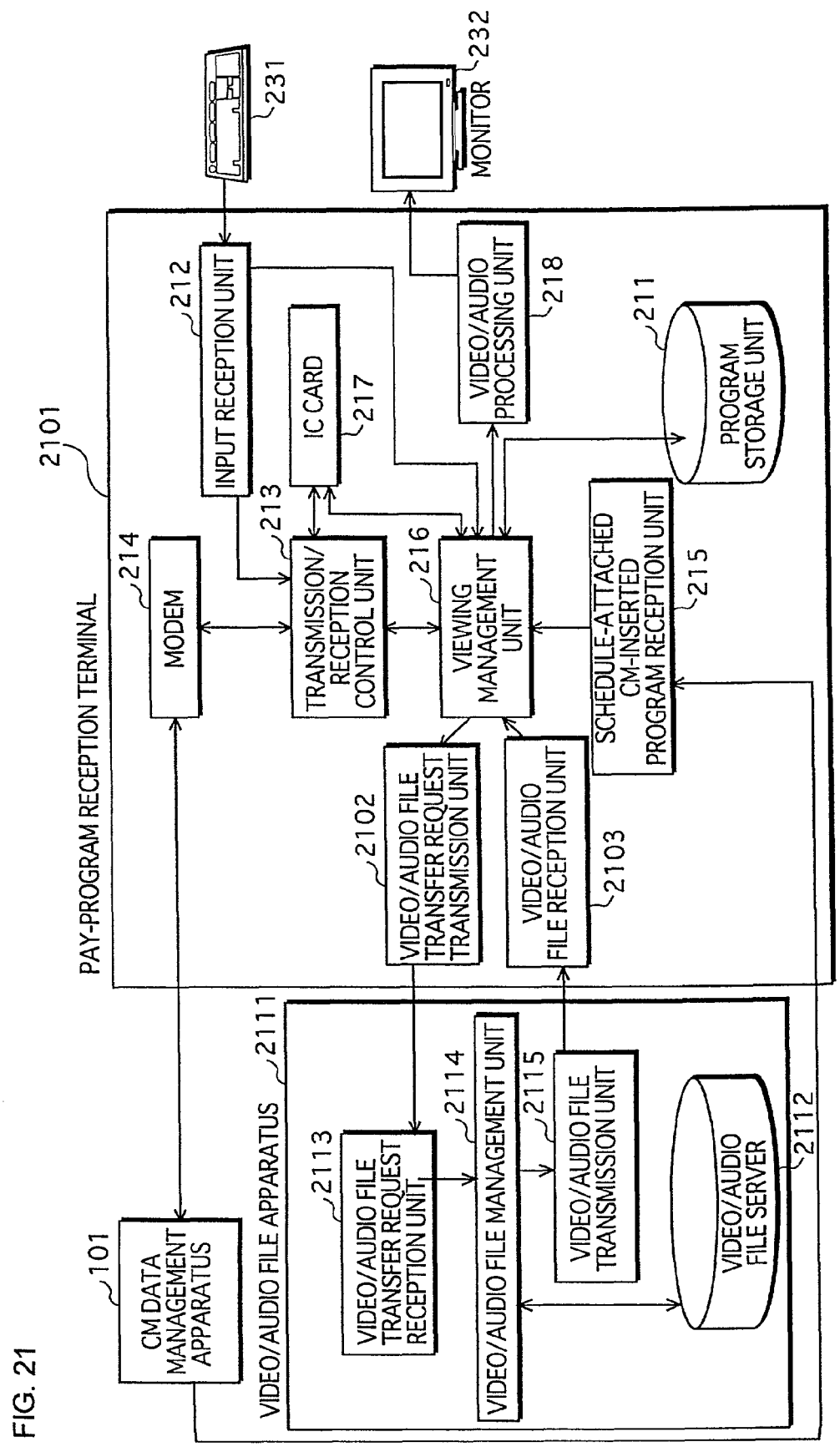
FIG. 21 is a construction diagram of a pay-program transmission/reception system relating a sixth embodiment of the present invention.

FIG. 21 is a construction diagram of the sixth embodiment. This pay-program transmission/reception system is roughly composed of a CM data management apparatus 101, a pay-program reception terminal 2101, and a video/audio file apparatus 2111.

The pay-program reception terminal 2101 includes, in addition to the construction of the pay-program reception terminal 102 in the first embodiment, a video/audio file transfer request transmission unit 2102 and a video/audio file reception unit 2103.

The video/audio file apparatus 2111 includes a video/audio file server 2112, a video/audio file transfer request reception unit 2113, a video/audio file management unit 2114, and a video/audio file transmission unit 2115.

The components that are the same as those in the first embodiment are given the same reference numerals, and are not described in the present embodiment. The present embodiment is described focusing only on its unique construction.

In the schedule-attached CM-inserted program in the present embodiment, some of the video/audio data pieces constituting a pay program are cut out when CM data pieces are inserted into the pay program.

FIG. 22 shows one example of a program schedule for a pay program. According to this program schedule 2201, a pay program "MOVIE 1" is composed of video/audio data pieces identified by file IDs "CUT1", "CUT2", "CUT3", "CUT4", . . .

The schedule-attached CM-inserted program server 202 stores a schedule-attached CM-inserted program in which a video/audio data piece identified by a file ID "CUT3" is cut out when the CM data pieces are inserted. In this schedule-attached CM-inserted program, the video/audio data piece identified by the file ID "CUT3" is cut out and CM data pieces identified by file IDs "CM1" and "CM2" are inserted as shown by the CM-inserted program schedule 2301 in FIG. 23.

In such a case where a video/audio data piece of a pay program is cut out, the schedule-attached CM-inserted program management unit 207 stores a program schedule of uncut version that includes, instead of a file ID, a source from which the cut video/audio data can be obtained.

FIG. 24 shows one example of a uncut version program schedule. According to the uncut version program schedule 2401, the "file ID" field 2403 corresponding to the third data piece 2402 in the reproduction order shows a URL "http://.../ ..." on the Internet at which a video/audio data identified by the file ID "CUT3" is stored.

Upon receipt of a message indicating an agreement on a CM deletion from the pay-program reception terminal 102 via the transmission/reception control unit 206, the schedule-attached CM-inserted program management unit 207 passes the agreement message to the CM viewing record management unit 204. At the same time, the schedule-attached CM-inserted program management unit 207 instructs, via the transmission/reception control unit 206, the modem 205 to transmit the stored uncut version program schedule 2401 to the pay-program reception terminal 102.

Upon receipt of the uncut version program schedule 2401 via the modem 214 and the transmission/reception control unit 213, the viewing management unit 216 passes the URL written in the corresponding "file ID" field 2403, to the video/audio file transfer request transmission unit 2102. Then, the viewing management unit 216 instructs the video/audio file transfer request transmission unit 2102 to give a request for transferring a video/audio data piece.

Upon receipt of the video/audio data piece that is requested to be transferred from the video/audio file reception unit 2103, the viewing management unit 216 reads a file ID of the video/audio data piece, and updates the URL written in the "file ID" field 2403 in the uncut version program schedule 2401 to the read file ID. At the same time, the viewing management unit 216 stores the updated uncut version program schedule 2401 into its internal storage region, and also, stores the video/audio data piece into the program storage unit 211.

Upon first receipt of the schedule-attached CM-inserted program, the viewing management unit 216 reads the CM-inserted pay program according to the CM-inserted program schedule 2301 for the CM-inserted program. Following this, the viewing management unit 216 receives the uncut version program schedule 2401, obtains the video/audio data piece identified by the file ID "CUT3", and stores the program schedule 2201.

Upon receipt of an instruction to give the transfer request from the viewing management unit 216, the video/audio file transfer request transmission unit 2102 transmits, via the Internet, the transfer request for the video/audio data piece to the video/audio file apparatus 2111 that is present at the received URL.

Upon receipt of the video/audio data piece that is requested to be transferred from the video/audio file apparatus 2111, the video/audio file reception unit 2103 passes the received video/audio data piece to the viewing management unit 216.

The video/audio file apparatus 2111 is identified by a predetermined URL on the Internet.

The video/audio file server 2112 is constructed by a hard disk or the like. The video/audio file server 2112 stores pay-program video/audio data pieces that have been cut out due to CM insertion.

Upon receipt of the transfer request for the video/audio data piece from the pay-program reception terminal 2101 or the like, the video/audio file transfer request reception unit 2113 passes the received transfer request to the video/audio file management unit 2114.

Upon receipt of the transfer request from the video/audio file transfer request reception unit 2113, the video/audio file management unit 2114 reads a file of the received video/audio data piece from the video/audio file server 2112, and passes the read file to the video/audio file transmission unit 2115.

Upon receipt of the video/audio data piece from the video/audio file management unit 2114, the video/audio file transmission unit 2115 transmits the received video/audio data piece to the pay-program reception terminal 2101 or the like that has given the transfer request.

Figure 25:
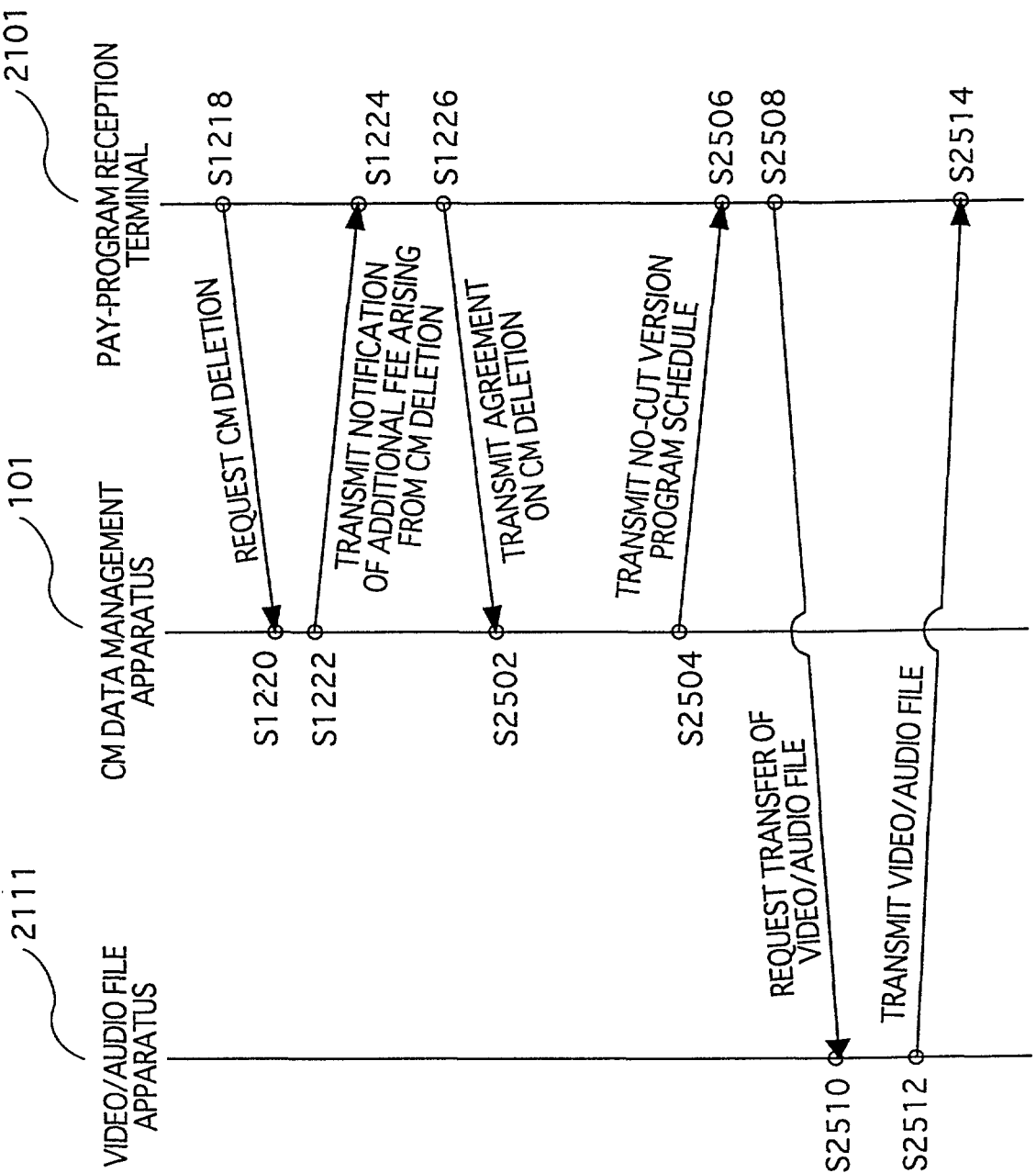
FIG. 25 is a sequence diagram showing the operations of a video/audio file apparatus, a CM data management apparatus, and a pay-program reception terminal in the sixth embodiment.

The following describes the operations of the present embodiment, with reference to a sequence diagram shown in FIG. 25.

It should be noted that the processing in steps up until S1226 in this sequence diagram is the same as in the first embodiment, and therefore is not described here.

In S2502, when the schedule-attached CM-inserted program management unit 207 in the CM data management apparatus receives a message indicating an agreement on CM deletion, the schedule-attached CM-inserted program management unit 207 passes the agreement message to the CM viewing record management unit 204, and at the same time, passes a uncut version program schedule 2401 to the modem 205 via the transmission/reception control unit 206, and instructs the modem 205 to transmit the uncut version program schedule 2401 to the pay-program reception terminal 2101 that has given the CM deletion request.

The modem 205 transmits the uncut version program schedule 2401 to the pay-program reception terminal 2101 (S2504).

To obtain a video/audio data whose URL is written in the "file ID" field 2403 in the uncut version program schedule 2401, the viewing management unit 216 in the pay-program reception terminal 2101 instructs the video/audio file transfer request transmission unit 2102 to pass the URL at which the video/audio data piece is stored, and to give a transfer request for the video/audio data piece (S2506).

The video/audio file transfer request transmission unit 2102 transmits the transfer request for the video/audio data piece to the video/audio file apparatus 2111 identified by the URL (S2508).

The video/audio file transfer request reception unit 2113 that has received the video/audio file transfer request passes the received transfer request to the video/audio file management unit 2114. The video/audio file management unit 2114 reads a file of the designated video/audio data piece from the video/audio file server 2112, and passes the read file to the video/audio file transmission unit 2115 (S2510).

The video/audio file transmission unit 2115 transmits the file of the video/audio data piece to the pay-program reception terminal 2101 that has given the transfer request (S2512).

The video/audio file reception unit 2103 in the pay-program reception terminal 2101 receives the file of the video/audio data piece. The viewing management unit 216 stores the video/audio data piece into the program storage unit 211, and updates the uncut version program schedule 2401 to the program schedule 2201 (S2514).

In the present embodiment, even if some scenes are cut out when CM data pieces are inserted into a pay program, a viewer who gives a deletion request for CMs from the schedule-attached CM-inserted program can obtain a uncut version program schedule 2401 in which the reproduction order of CMs is not shown, and the viewer can obtain the cut scenes from the video/audio file apparatus 2111 via the Internet. Therefore, the viewer can view a pay program of uncut version without newly obtaining the whole pay program, thereby alleviating a burden on the viewer.

(Seventh Embodiment)

The following describes a pay-program transmission/reception system relating to a seventh embodiment of the present embodiment. In the above sixth embodiment, video/audio data pieces that have been cut out due to CM insertion are obtained from the video/audio file apparatus 2111. In the present embodiment, however, such cut video/audio data pieces are obtained as being included in the schedule-attached CM-inserted program in advance in the pay-program reception terminal 102, and stored in the program storage unit 211. Therefore, when CMs are deleted from a CM-inserted pay program, a viewer can immediately view its uncut version pay program.

The present embodiment is described, with reference to the construction diagram referred to in the first embodiment (FIG. 2).

FIG. 26 shows one example of a CM-inserted program schedule for a schedule-attached CM-inserted program transmitted from the CM data management apparatus 101.

The CM-inserted program schedule 2601 is provided with a "video/audio cut judgment" field 2602 instead of the "CM deletion judgment" field 1703 in the CM-inserted program schedule 1701. When the "video/audio cut judgment" field 2602 shows "○", a file of video/audio data piece identified by the corresponding file ID 502 is not reproduced.

The schedule-attached CM-inserted program management unit 207 in the CM data management apparatus 101 transmits, instead of an instruction to transmit a uncut version program schedule in S2502 in the sixth embodiment, a message indicating reception of an agreement on the CM deletion to the modem 205 via the transmission/reception control unit 206. The modem 205 transmits this agreement reception message to the pay-program reception terminal 102.

Upon receipt of the agreement reception message via the modem 214 and the transmission/reception control unit 216, the viewing management unit 216 deletes a line in the CM-inserted program schedule 2601 whose "CM judgment" field 1702 shows "o", and updates the "video/audio cut judgment" field 2602 corresponding to a video/audio data piece showing "o", to show "×". Due to this, the CM-inserted program schedule 2601 becomes a program schedule of uncut version in which no video/audio data pieces of a pay program are cut out. The viewing management unit 216 stores this uncut version program schedule into its internal storage region.

Figure 27:
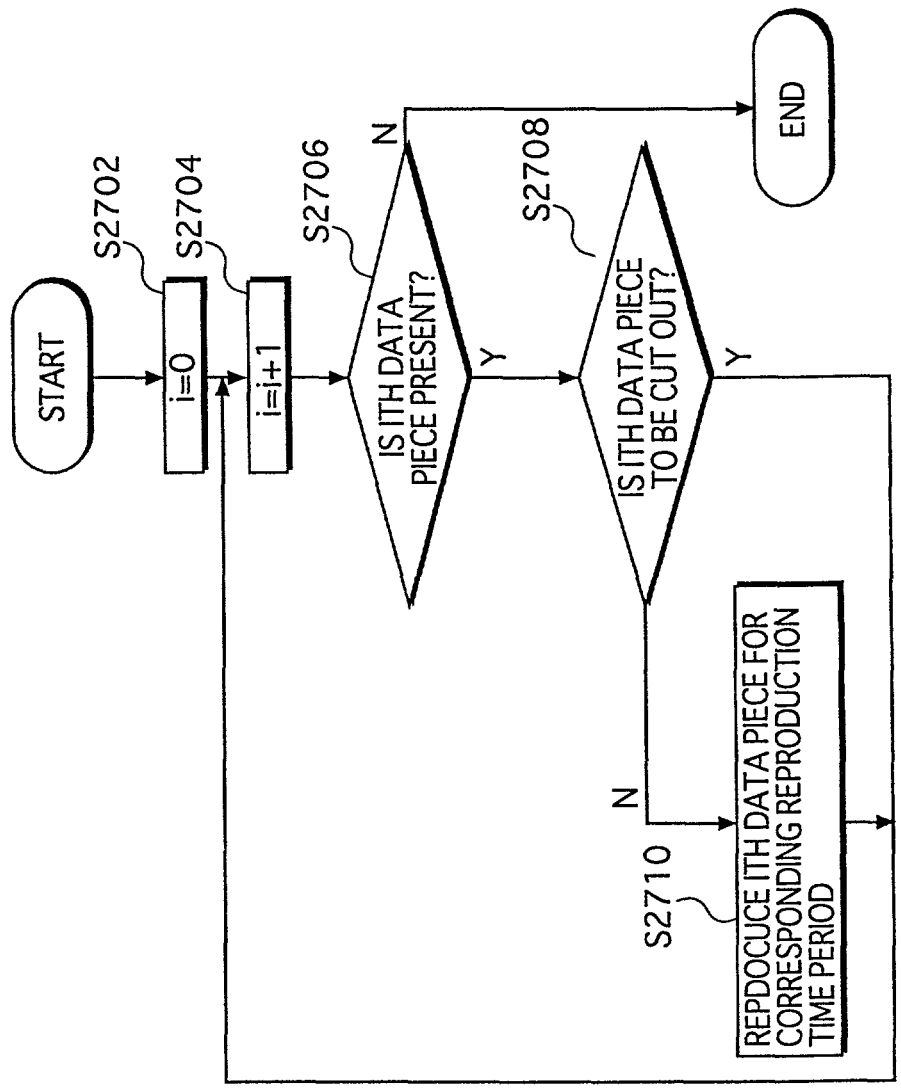
FIG. 27 is a flowchart showing the reproduction operations of a pay-program reception terminal in the seventh embodiment.

The following describes the reproduction operations of a schedule-attached CM-inserted program or a pay program in the pay-program reception terminal 102, with reference to a flowchart shown in FIG. 27.

Upon receipt of a reproduction instruction from the input reception unit 212, the viewing management unit 216 initializes counter i to "0" (S2702). The viewing management unit 216 adds "1" to counter i (S2704). The viewing management unit 216 then judges whether the ith data piece is present in the CM-inserted program schedule 2601 or in the program schedule or not (S2706). When the ith data piece is present, the viewing management unit 216 judges whether the "video/audio cut judgment" field 2602 corresponding to the ith data piece identified by the file ID shows "○" or not (S2708). When this judgment result is negative, the viewing management unit 216 reads, from the program storage unit 211, the video/audio data or CM data piece identified by this ID file, for the corresponding reproduction time period from the corresponding start point. The viewing management unit 216 then passes the read data piece to the video/audio processing unit 218. The video/audio processing unit 218 outputs the received data piece onto the monitor 232 (S2710).

When the "video/audio cut judgment" field 2602 shows "○" in S2708, the processing returns to S2704.

When the ith data piece is not present in S2706, the processing ends.

In the present embodiment, the CM-inserted program schedule 2601 is provided with the "video/audio cut judgment" field 2602. When a schedule-attached CM-inserted program is first transmitted, symbol "o" is written into the "video/audio cut judgment" field 2602 corresponding to a video/audio data piece that is to be cut out. The "video/audio cut judgment" field 2602 is then updated from "o" to "×" at the time of CM deletion. By doing so, a uncut version program schedule can be generated.

(Eighth Embodiment)

The following describes a pay-program transmission/reception system relating to an eighth embodiment of the present embodiment. In the eighth embodiment, in a case where some of the video/audio data pieces for a pay program have been cut out due to insertion of CM data pieces, the cut video/audio data pieces each are given a priority level for restoration, so that a scene to be restored can be selected when a CM data piece is deleted. By doing so, a CM data piece to be deleted can be selected.

The present embodiment results from a combination of the third embodiment and the seventh embodiment.

FIG. 28 shows one example of a CM-inserted program schedule transmitted as being included in a schedule-attached CM-inserted program in the eighth embodiment.

The CM-inserted program schedule 2801 is provided with a "restoration priority level" field 2802. The "restoration priority level" field 2802 shows a value for a video/audio data piece that remains to be cut out in a state where no CM data piece is deleted. In other words, a video/audio data piece whose "video/audio cut judgment" field 2602 shows "○" is given a restoration priority level. A value for this restoration priority level is decremented by "1" every time when one CM data piece is deleted. When the value reaches "0", the corresponding "video/audio cut judgment" field 2602 is updated from "○" to "×".

As one example, when a CM data piece identified by a file ID 502 "CM1" is deleted, restoration priority levels for video/audio data pieces respectively identified by file IDs "CUT2.2", "CUT4.2", and "CUT4.3" become "0", "1", and "2". A video/audio data piece identified by the file name "CUT2.2" is reproduced. Further, when a CM data piece identified by the file ID "CM2" is deleted, a video/audio data identified by the file ID "CUT4.2" is also reproduced.

Further, when deletion of a CM data piece identified by the file ID "CM3" is selected, symbol "×" is written into the "video/audio cut judgment" field 2602 corresponding to a video/audio data piece identified by the filename "CUT4.3", and this video/audio data is reproduced.

It should be noted here that such deletion of CMs and update of the "restoration priority" field 2802 and the "video/audio cut judgment" field 2602 are performed by the viewing management unit 216.

Also, although the present embodiment describes the case where the cut video/audio data pieces are transmitted as being included in the schedule-attached CM-inserted program from the CM data management apparatus 101 to the pay-program reception terminal 102, a URL may be stored instead of a file ID, and a cut video/audio data piece may be obtained from the video/audio file apparatus in accordance with the necessity of reproduction as in the sixth embodiment.

In the present embodiment, only necessary scenes can be restored by a viewer selecting CMs to be deleted.

(Ninth Embodiment)

The following describes a pay-program transmission/reception system relating to a ninth embodiment of the present embodiment.

The ninth embodiment is not largely different from the construction of each above embodiment in its construction. Therefore, the present embodiment is described focusing only on its unique construction, with reference to the construction diagram in FIG. 2.

The present embodiment attends to a fact that the same CM viewed a number of times or more produces only a certain degree of advertisement effect. In the present embodiment, therefore, the maximum number of times one CM can be viewed is set.

The CM data management apparatus 101 transmits a viewing limitation table that shows the maximum viewing number of a CM set in advance, together with a schedule-attached CM-inserted program, from the schedule-attached CM-inserted program transmission unit 208 to the pay-program reception terminal 102.

The schedule-attached CM-inserted program reception unit 215 in the pay-program reception terminal 102 receives the viewing limitation table and passes it to the viewing management unit 216.

The viewing management unit 216 stores the received viewing limitation table into its internal storage region.

FIG. 29 shows one example of the viewing limitation table. The viewing limitation table 2901 includes a "CM name" field 2902 and a "maximum viewing number" field 2903 for each CM.

When the viewing management unit 216 reads video/audio data pieces and/or CM data pieces identified by file IDs in the reproduction order shown by the CM-inserted program schedule 402 stored in the program storage unit 211, the viewing management unit 216 judges whether each data piece is a CM data piece or not. When judging that the data piece is a CM data piece, the viewing management unit 216 judges whether the maximum viewing number of the CM data piece exceeds "0" or not. When judging that the maximum viewing number of the CM data piece exceeds "0", the viewing management unit 216 reads the CM data piece, and passes the read CM data piece to the video/audio processing unit 218. Here, the viewing management unit 216 decrements "1" from the maximum viewing number of the CM data piece. When judging that the maximum viewing number of the CM data piece is equal to or less than "0", the viewing management unit 216 does not read the CM data piece, and moves on to a judgment for a next video/audio data piece or CM data piece in the reproduction order.

As one example, when a CM data piece identified by a file name "CM1" is reproduced 20 times, the CM data piece is not reproduced anymore because no more advertisement effect is expected and also a viewer may be tired of viewing the same CM many times.

Figure 30:
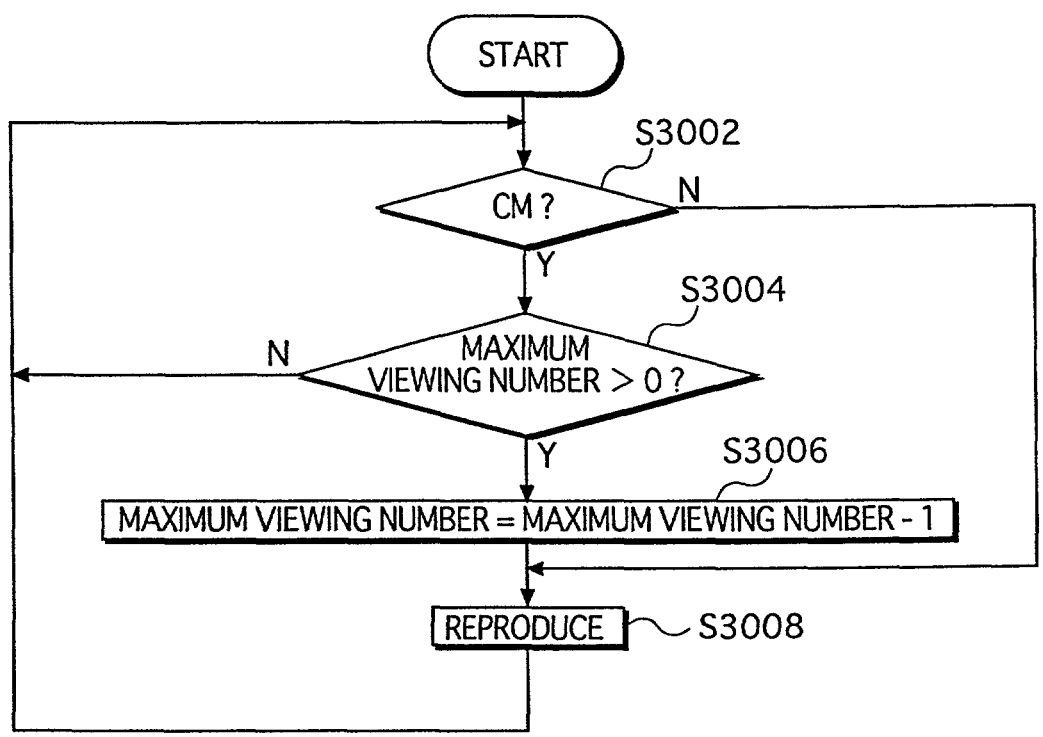
FIG. 30 is a flowchart showing the operations of a pay-program reception terminal in the ninth embodiment.

The following describes the operations of the pay-program reception terminal 102 in the present embodiment, with reference to a flowchart in FIG. 30.

The viewing management unit 216 judges whether a data piece to be read from the program storage unit 211 is a CM data piece or not (S3002). When the data piece is not a CM data piece, the processing advances to S3008. When the data piece is a CM data piece, the viewing management unit 216 judges whether the maximum viewing number of the CM data piece exceeds "0" or not (S3004). When the maximum viewing number does not exceed "0", the processing returns to S3002. When the maximum viewing number exceeds "0", the viewing management unit 216 decrements "1" from the maximum viewing number (S3006)

The viewing management unit 216 reads a video/audio data piece or a CM data piece, and passes the read data piece to the video/audio processing unit 218. The video/audio processing unit 218 reproduces the received data piece on the monitor 232 (S3008), and the processing returns to S3002.

It should be noted here that although each of the above embodiments describes the case where a schedule-attached CM-inserted program is transmitted from the schedule-attached CM-inserted program transmission unit 208 to the schedule-attached CM-inserted program reception unit 215 via a broadcast wave, it may instead be transmitted via a public line network, or via a communication cable used for a cable television. Also, communication between the modem 214 and the modem 205 may also be performed via an upward line of a communication cable used for a cable television.

It should be noted here that although the construction diagrams of the above embodiments are shown in FIGS. 2, 19, and 21, the functions of the components shown therein may be realized by a program that can be executed on a computer.

Also, the program may be recorded on a computer-readable storage medium, and this computer-readable storage medium may be applied to a pay-program transmission/reception system that is required to transmit and receive the whole pay program when CMs are deleted from the pay program.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A CM (commercial message) management apparatus for managing a CM-inserted program and transmitting the CM-inserted program to a plurality of pay-program reception terminals, the apparatus comprising:
    an information processing computer configured to:
    store, the CM-inserted program, which is reproduction-target AV (audio-visual) data that is a pay program and CMs, the pay program being composed of a plurality of pay program portions;
    store, a CM-inserted program schedule providing instructions for an order that the pay program portions and the CMs of the reproduction-target AV data are to be reproduced;
    upon receiving a request for the pay program from one of the pay-program reception terminals, read the CM-inserted program including the requested pay program and read the CM-inserted program schedule;
    transmit the CM-inserted program and the CM-inserted program schedule to the one of the pay-program reception terminals;
    receive a CM deletion request to delete one or more of the CMs from the one of the pay-program reception terminals; upon receiving the CM deletion request, store the received CM deletion request as a history;
    based on the history of the received CM deletion request, calculate an additional fee to be charged on the one of the pay-program reception terminals for a permission to delete the one or more of the CMs as requested;
    transmit information indicating the calculated additional fee to the one of the pay-program reception terminals;
    receive a CM deletion instruction to delete the one or more of the CMs from the one of the pay-program reception terminals; and
    upon receiving the CM deletion instruction, transmit only a new program schedule to the one of the pay-program reception terminals without transmitting the CM-inserted program to the one of the pay-program reception terminals, the new program schedule providing instructions for an order that the pay program portions and remaining CMs are to be reproduced, the remaining CMs being CMs that are not requested to be deleted in the CM deletion request.

2. A CM management apparatus according to claim 1, wherein the information processing computer is further configured to perform:
    calculating, when receiving the CM deletion request, (a) the additional fee to be charged on the one of the pay-program reception terminals according to a number of CMs to be deleted, and (b) a return fee to be returned to an advertiser according to the number of CMs to be deleted.

3. A CM management apparatus according to claim 2, wherein the information processing computer is further configured to perform:
    transmitting a notification of the additional fee to the one of the pay-program reception terminals; and transmitting the new program schedule, in response to receiving a payment message indicating that the additional fee is to be paid from the one of the pay-program reception terminals.

4. A CM management apparatus according to claim 3, wherein the information processing computer is further configured to perform:
determining whether a CM deletion judgment field of the CM-inserted program schedule shows a judgment result as to whether each piece of CM data is to be deleted or not;
determining whether the CM deletion judgment field shows that no pieces of CM data are to be deleted when the CM-inserted program schedule is transmitted; and
transmitting a notification showing reception of the payment message to the one of the pay-program reception terminals indicating that the additional fee is to be paid, instead of transmitting the new program schedule.

5. A CM management apparatus according to claim 3, wherein the information processing computer is further configured to perform:
determining whether the CM-inserted program schedule includes cut judgment fields that respectively correspond to the pay program portions, each of the cut judgment fields showing whether or not reproduction of the corresponding pay program portion should be cut out;
determining whether each of the cut judgment fields shows the corresponding pay program portion that should be cut out when a corresponding pay program portion is to be cut out due to insertion of the corresponding CM; and
transmitting a notification showing reception of the payment message to the one of the pay-program reception terminals, instead of transmitting the new program schedule.

6. A CM management apparatus according to claim 2, wherein the information processing computer is further configured to perform:
receiving a notification of a number of times each CM has been viewed from the one of the pay-program reception terminals;
calculating a discount on the additional fee based on the number of times each CM has been viewed; and
calculating a discounted additional fee, by subtracting the calculated discount from the additional fee.

7. A CM management apparatus according to claim 1, wherein the information processing computer is further configured to perform:
counting a number of times the pay program has been transmitted, and a number of times each CM has been transmitted, wherein the number of times the pay program has been transmitted is associated with a name of the pay program, and the number of times each CM has been transmitted is associated with a name of the CM;
storing a fee charged for a one-time transmission of the pay program and storing an advertisement fee charged for a one-time transmission of each CM; and
calculating a fee according to the counted number of times the pay program has been transmitted according to the fee charged for the one-time transmission of the pay program, and a fee according to the counted number of times each CM has been transmitted according to the one-time transmission of each CM.

8. A CM management apparatus according to claim 7, wherein the information processing computer is further configured to perform:
counting the number of times the pay program has been transmitted and the number of times each CM has been transmitted by referring to the CM-inserted program schedule.

9. A CM management apparatus according to claim 1, wherein the information processing computer is further configured to perform:
receiving names of the CMs that are selected to be deleted by the one of the pay-program reception terminals, and calculate the additional fee to be charged on the one of the pay-program reception terminals according to a number of the CMs to be deleted; and
transmitting a notification of the additional fee to the one of the pay-program reception terminals.

10. A CM management apparatus according to claim 1, wherein the information processing computer is further configured to perform:
determining whether one or more pieces of pay program video and audio data have been cut out due to insertion of the CMs;
determining whether the CM-inserted program schedule includes a cut judgment field, that shows that all the cut pieces of the pay-program video and audio data remain to be cut out when the CM-inserted program schedule is transmitted;
receiving names of the CMs that are selected to be deleted by the one of the pay-program reception terminals, and calculate the additional fee to be charged to the one of the pay-program reception terminals according to a number of the CMs to be deleted; and
transmitting a notification of the calculated additional fee to the one of the pay-program reception terminals.

11. A CM management apparatus according to claim 1, wherein the information processing computer is further configured to perform:
transmitting, together with the CM-inserted program and the CM-inserted program schedule, to the one of the pay-program reception terminals, a viewing limitation table that shows a maximum number of times each CM may be viewed at the one of the pay-program reception terminals.

12. A CM (commercial message) management method used by an information processing computer of a CM management apparatus for managing a CM-inserted program, and transmitting the CM-inserted program to a plurality of pay-program reception terminals, the method comprising:
storing, the CM-inserted program, which is reproduction-target AV (audio-visual) data that is a pay program and CMs, the pay program being composed of a plurality of pay program portions;
storing, a CM-inserted program schedule providing instructions for an order that the pay program portions and the CMs of the reproduction-target AV data are to be reproduced;
upon receiving, by the information processing computer, a request for the pay program from one of the pay-program reception terminals, reading the CM-inserted program including the requested pay program and reading the CM-inserted program schedule;
transmitting, by the information processing computer, the CM-inserted program and the CM-inserted program schedule to the one of the pay program reception terminals;
receiving, by the information processing computer, a CM deletion request to delete one or more of the CMs from the one of the pay-program reception terminals;

upon receiving the CM deletion request, storing the received CM deletion request as a history;

based on the history of the received CM deletion request, calculating, by the information processing computer, an additional fee to be charged on the one of the pay-program reception terminals for a permission to delete the one or more of the CMs as requested;

transmitting information, by the information processing computer, indicating the calculated additional fee to the one of the pay-program reception terminals;

receiving, by the information processing computer, a CM deletion instruction to delete the one or more of the CMs from the one of the pay-program reception terminals; and upon receiving the CM deletion instruction, transmitting, by the information processing computer, a new program schedule to the one of the pay-program reception terminals without transmitting the CM-inserted program to the one of the pay-program reception terminals, the new program schedule providing instructions for an order that the pay program portions and remaining CMs are to be reproduced, the remaining CMs being CMs that are not requested to be deleted in the CM deletion request.

13. A non-transitory computer-readable storage medium storing instructions that when executed by a computer cause the computer to execute the following steps:

store, a CM-inserted program and a CM-inserted program schedule, the CM-inserted program being reproduction-target AV (audio-visual) data that is a pay program and CMs, the pay program being composed of a plurality of pay program portions, the CM-inserted program schedule providing instructions for an order that the pay program portions and the CMs of the reproduction-target AV data are to be reproduced;

upon receiving a request for the pay program from one of a plurality of pay-program reception terminals, read the CM-inserted program including the requested pay program and read the CM-inserted program schedule;

transmit the CM-inserted program and the CM-inserted program schedule to the one of the pay program reception terminals;

receive a CM deletion request to delete one or more of the CMs from the one of the pay-program reception terminals;

upon receiving the CM deletion request, store the received CM deletion request as a history;

based on the history of the received CM deletion request, calculate an additional fee to be charged on the one of the pay-program reception terminals for a permission to delete the one or more of the CMs as requested;

transmit information indicating the calculated additional fee to the one of the pay-program reception terminals;

receive a CM deletion instruction to delete the one or more of the CMs from the one of the pay-program reception terminals; and upon receiving the CM deletion instruction, transmit only a new program schedule to the one of the pay-program reception terminals without transmitting the CM-inserted program to the one of the pay-program reception terminals, the new program schedule providing instructions for an order that the pay program portions and remaining CMs are to be reproduced, the remaining CMs being CMs that are not requested to be deleted in the CM deletion request.

* * * * *